(12) United States Patent
Hall et al.

(10) Patent No.: US 7,656,881 B2
(45) Date of Patent: Feb. 2, 2010

(54) METHODS FOR EXPEDITED START-UP AND CLIQUE AGGREGATION USING SELF-CHECKING NODE PAIRS ON A RING NETWORK

(75) Inventors: Brendan Hall, Eden Prairie, MN (US); Michael Paulitsch, Columbia Heights, MN (US); Kevin R. Driscoll, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 393 days.

(21) Appl. No.: 11/610,450

(22) Filed: Dec. 13, 2006

(65) Prior Publication Data
US 2008/0144526 A1 Jun. 19, 2008

(51) Int. Cl.
*H04L 12/28* (2006.01)
(52) U.S. Cl. ................................. 370/395.32
(58) Field of Classification Search ................. 370/400, 370/258
See application file for complete search history.

(56) References Cited

U.S. PATENT DOCUMENTS

| | | | |
|---|---|---|---|
| 4,417,334 A | 11/1983 | Gunderson et al. | |
| 4,428,046 A | 1/1984 | Chari et al. | |
| 4,630,254 A | 12/1986 | Tseng | |
| 4,631,718 A | 12/1986 | Miyao | |
| 4,733,391 A | 3/1988 | Godbold et al. | |

(Continued)

FOREIGN PATENT DOCUMENTS

AT 407582 B 4/2001

(Continued)

OTHER PUBLICATIONS

Al-Rousan et al., "The Two-Processor Reliability of Hierarchical Larg-Scale Ring-Based Networks", "Proceedings of the 29th Hawaii International Conference on System Sciences", 1996, pp. 63-71.

(Continued)

*Primary Examiner*—Dang T Ton
*Assistant Examiner*—Frederick Ott
(74) *Attorney, Agent, or Firm*—Fogg & Powers LLC

(57) ABSTRACT

In one embodiment, a system comprises a plurality of nodes that are communicatively coupled to one another. Each of the plurality of nodes, in the absence of any faults, is communicatively coupled to at least a first neighbor node and a first neighbor's neighbor node and a second neighbor node and a second neighbor's neighbor node. When at least a first clique and a second clique exist within the plurality of nodes and a first node included in the first clique successfully receives a synchronization message associated with the second clique from the first neighbor node of the first node and the first neighbor's neighbor node of the first node, the first node does the following. The first node defects to the second clique and synchronizes to the synchronization message. The first node also communicates a join message to at least the second neighbor node of the first node and the second neighbor's neighbor node of the first node. The join message indicates that the second neighbor node and the second neighbor's neighbor node should defect to the second clique and listen for a subsequent synchronization message from the second clique to which the second neighbor node and the second neighbor's neighbor node should synchronize.

20 Claims, 19 Drawing Sheets

U.S. PATENT DOCUMENTS

| | | | |
|---|---|---|---|
| 4,740,958 | A | 4/1988 | Duxbury et al. |
| 4,856,023 | A | 8/1989 | Singh |
| 4,866,606 | A | 9/1989 | Kopetz |
| 4,905,230 | A | 2/1990 | Madge et al. |
| 5,132,962 | A | 7/1992 | Hobgood et al. |
| 5,161,153 | A | 11/1992 | Westmore |
| 5,235,595 | A | 8/1993 | O'Dowd |
| 5,257,266 | A | 10/1993 | Maki |
| 5,307,409 | A | 4/1994 | Driscoll |
| 5,341,232 | A | 8/1994 | Popp |
| 5,383,191 | A | 1/1995 | Hobgood et al. |
| 5,386,424 | A | 1/1995 | Driscoll et al. |
| 5,394,401 | A | 2/1995 | Patrick et al. |
| 5,463,634 | A | 10/1995 | Smith et al. |
| 5,557,778 | A | 9/1996 | Vaillancourt |
| 5,687,356 | A | 11/1997 | Basso et al. |
| 5,715,391 | A | 2/1998 | Jackson et al. |
| 5,896,508 | A | 4/1999 | Lee |
| 5,903,565 | A | 5/1999 | Neuhaus et al. |
| 5,920,267 | A | 7/1999 | Tattersall et al. |
| 5,937,414 | A | 8/1999 | Souder et al. |
| 5,940,367 | A | 8/1999 | Antonov |
| 6,052,753 | A | 4/2000 | Doerenberg et al. |
| 6,172,984 | B1 | 1/2001 | Beyda et al. |
| 6,175,553 | B1 | 1/2001 | Luk et al. |
| 6,226,676 | B1 | 5/2001 | Crump et al. |
| 6,374,078 | B1 | 4/2002 | Williams et al. |
| 6,414,953 | B1 | 7/2002 | Lamarche et al. |
| 6,513,092 | B1 | 1/2003 | Gorshe |
| 6,594,802 | B1 | 7/2003 | Ricchetti et al. |
| 6,618,359 | B1 | 9/2003 | Chen et al. |
| 6,707,913 | B1 | 3/2004 | Harrison et al. |
| 6,741,559 | B1 | 5/2004 | Smeulderse et al. |
| 6,760,768 | B2 | 7/2004 | Holden et al. |
| 6,765,924 | B1 | 7/2004 | Wu et al. |
| 6,842,617 | B2 | 1/2005 | Williams et al. |
| 6,925,497 | B1 | 8/2005 | Vetrivelkumaran et al. |
| 6,956,461 | B2 | 10/2005 | Yoon et al. |
| 7,035,539 | B2 | 4/2006 | Gumaste |
| 7,050,395 | B1 | 5/2006 | Chow et al. |
| 7,085,560 | B2 | 8/2006 | Petermann |
| 7,088,921 | B1 | 8/2006 | Wood |
| 7,269,177 | B2 | 9/2007 | Baker |
| 7,349,414 | B2 | 3/2008 | Sandstrom |
| 7,372,859 | B2 * | 5/2008 | Hall et al. ............ 370/400 |
| 7,457,303 | B2 | 11/2008 | Blumrich et al. |
| 7,502,334 | B2 | 3/2009 | Hall et al. |
| 2002/0027877 | A1 | 3/2002 | Son et al. |
| 2002/0087763 | A1 | 7/2002 | Wendorff |
| 2002/0118636 | A1 | 8/2002 | Phelps et al. |
| 2003/0067867 | A1 | 4/2003 | Weis |
| 2003/0128984 | A1 | 7/2003 | Oberg et al. |
| 2004/0073698 | A1 | 4/2004 | Harter et al. |
| 2004/0223515 | A1 | 11/2004 | Rygielski et al. |
| 2004/0258097 | A1 | 12/2004 | Arnold et al. |
| 2005/0002332 | A1 | 1/2005 | Oh |
| 2005/0132105 | A1 | 6/2005 | Hall et al. |
| 2005/0135278 | A1 | 6/2005 | Hall et al. |
| 2005/0152377 | A1 * | 7/2005 | Hall et al. ............ 370/400 |
| 2005/0169296 | A1 | 8/2005 | Katar et al. |
| 2005/0198280 | A1 * | 9/2005 | Hall et al. ............ 709/224 |
| 2006/0077981 | A1 | 4/2006 | Rogers |
| 2006/0203851 | A1 | 9/2006 | Eidson |
| 2008/0010705 | A1 | 1/2008 | Quaid et al. |
| 2008/0080551 | A1 | 4/2008 | Driscoll et al. |
| 2008/0144668 | A1 | 6/2008 | Hall et al. |
| 2009/0086653 | A1 | 4/2009 | Driscoll et al. |

FOREIGN PATENT DOCUMENTS

| | | |
|---|---|---|
| DE | 3238692 | 4/1984 |
| DE | 19633744 | 2/1998 |
| DE | 20220280 | 11/2003 |
| EP | 0405706 | 2/1990 |
| EP | 1280024 | 1/2003 |
| EP | 1280312 | 1/2003 |
| EP | 1365543 | 11/2003 |
| EP | 1398710 | 3/2004 |
| EP | 1469627 | 10/2004 |
| GB | 2028062 | 2/1980 |
| GB | 1581803 | 12/1980 |
| GB | 2175775 | 12/1986 |
| WO | 0064122 | 10/2000 |

OTHER PUBLICATIONS

"Backplane Data Bus ARINC Specification 659", Dec. 1993, pp. 1-132, Publisher: ARINC.

Avizienis, "A Fault Tolerance Infrastructure for Dependable Computing With High-Performance Cots Componenets", "Conference Proceedings on Dependable Systems and Networks", Jun. 2000, pp. 492-500, Publisher: IEEE, Published in: New York, NY.

Bauer et al., "Assumption Coverage Under Different Failure Modes in the Time-Triggered Architecture", "8th IEEE International Conference on Emerging Technologies and Factory Automation", Oct. 2001, pp. 333-341, Publisher: IEEE.

Bauer et al., "Transparent Redundancy in the Time-Triggered Architecture", "Proceedings of the Conference on Dependable Systems and Networks", 2000, pp. 5-13, Publisher: IEEE.

Bauer et al., "The Central Guardian Approach to Enforce Fault Isolation in a Time-Triggered System", "Proceedings of Symposium on Autonomous Decentralized Systems", Apr. 2003, pp. 37-44, Publisher: IEEE.

Bosch, "Can Specification Version 2.0", "SAE Handbook—Parts and Components", 1998, pp. 1-72, vol. 2, Publisher: Society of Automotive Engineers.

D'Luna, "A Single-Chip Universal Cable Set-Top Box/Modern Transceiver", "Journal of Sold-State Circuits", Nov. 1998, pp. 1647-1660, vol. 34, No. 11, Publisher: IEEE.

Driscoll et al., "The Real Byzantine Generals", "Proceedings of Digital Avionics System Conference", Oct. 2004, pp. 6.D.4-1-6.D.4-11, Publisher: IEEE.

Brinkmeyer, "Flexray International Workshop Slides", "www.flexray-group.com", Apr. 2002, pp. 1-356, Publisher: Flexray.

"Flexray Communication System: Protocol Specification Version 2.1 Revision A", " www.flexray-group.com", Mar. 2006, pp. 1-8, Publisher: Flexray Consortium.

"Preliminary Node-Local Bus Guardian Specification Version 2.0.9", Dec. 2005, pp. 1-75, Publisher: Flexray Consortium.

"Preliminary Central Bus Guardian Specification Version 2.0.9", Dec. 2005, pp. 1-38, Publisher: Flexray Consortium.

Grnarov et al., "A Highly Reliable Distributed Loop Network Architecture", "Proceedings of Fault-Tolerant Computing Symposium", Jun. 1980, pp. 319-324, Publisher: IEEE.

Gruenbacher, "Fault Injection for TTA", 1999, Publisher: Information Society Technologies.

Hall et al., "Ringing Out Fault Tolerance a New Ring Network for Superior Low-Dost Dependabilitiy", "International Conference on Dependable Systems and Networks (DSN'05)", 2005, pp. 298-307.

Hammett et al., "Achieving 10-9 Dependability With Drive-by-Wire Systems", "SAE World Congress" 2003, pp. 534-547, vol. 112, No. 7, Publisher: Society of Automotive Engineers.

Hopper et al., "Design and Use of an Integrated Cambridge Ring", "Journal on Selected Areas in Communications", Nov. 2003, pp. 775-784, vol. 1, No. 5, Publisher: IEEE.

Hoyme et al., "SAFEbus", "Proceedings of the Digital Avionics Systems Conference", Oct. 1992, pp. 68-73, Publisher: IEEE.

Hoyme et al., "SAFEBUS", "IEEE Aerospce and Electronics Systems Magazine", Mar. 1993, pp. 34-39, vol. 8, No. 3, Publisher: IEEE.

Huber et al., "Silk: an Implementation of a Buffer Insertion Ring", "Journal on Selected Areas in Communications", Nov. 1983, pp. 766-774, vol. 1, No. 5, Publisher: IEEE.

Hwang et al., "Survival Reliability of Some Double-Loop Networks and Chordal Rings", "Transactions on Computers", 1995, pp. 1468-1471, vol. 44, No. 12, Publisher: IEEE.

"Internet Content Adaptation", "Network Appliance", Jul. 2001, pp. 1-13.

IEEE Computer Society, "1149.6 IEEE Standard for Boundary-Scan Testing of Advanced Digital Networks", Apr. 17, 2003, pp. 1-139, Publisher: IEEE, Published in: New York, NY.

Johansson et al., "On Communication Requirements for Control-by-Wire Applications", "Proceedings of System Safety Conference", Aug. 2003, pp. 1123-1132.

Kanoun et al., "Dependability Evaluation of Bus and Ring Communication Topologies for the Delta-4 Distr Fault-Tolerant Architecture", "Proceedings of the Symposium on Reliable Distributed Systems", 1991, pp. 130-141, Publisher: IEEE.

Kieckhafer et al., "The Maft Architecture for Distributed Fault Tolerance", "Transactions on Computers", 1988, pp. 398-405, vol. 37, No. 4, Publisher: IEEE.

Kopetz et al., "TTP—a Protocol for Fault-Tolerant Real-Time Systems", "Computer", Jan. 1194, pp. 14-23, vol. 27, No. 1, Publisher: IEEE Computer Society, Published in: Long Beach, CA.

Liu et al., "The Distributed Double-Loop Computer Network (DDLCN)", "ACM '80 Proceedings of the ACM 1980 Annual Conference", 1980, pp. 164-178, Publisher: ACM.

Lonn, "Initialsynchronization of TDMA Communication in Distributed Real-Time Systems", "Conference on Distributed Computing Systems", 1999, pp. 370-379, Publisher: IEEE.

Nayak et al., "Ring Reconfiguration in Presence of Close Fault Cuts", "Proceedings of Hawaii International Conference on System Science", 1996, pp. 422-428, Publisher: IEEE.

Paulitsch et al., "Cverage and the Use of Cyclic Redundancy Codes in Ultra-Dependable Systems", "2005 International Conference on Dependable Systems and Networks (DSN'05)", 2005, pp. 346-355.

Poledna et al., "Replica Determinism and Flexible Scheduling in Hard Real-Time Dependable Systms", "IEEE Transactions on Computers", Feb. 2000, pp. 100-111, vol. 49, No. 2, Publisher: IEEE.

Poledna, "Replica Determinism in Distributed Real-Time Systems: a Brief Survey", "Real-Time Systems", 1994, pp. 289-316, vol. 6.

"Software Considerations in Airborne Systems and Equipment Certification", "http://www.rtca.org", Dec. 1992, pp. 1-112, Publisher: RTCA.DO-178b.

Rushby, "Bus Architectures for Safety-Critical Embedded Systems, Embedded Software", "Proceedings of 1ST International Workshop on Embedded Software, Notes in Computer Science", Oct. 2001, pp. 306-323, vol. 2211, Publisher: Springer-Verlag, Published in: Germany.

Saltzer et al., "Why a Ring", "Proceedings of Symposium on Data Communications", 1981, pp. 211-217, Publisher: IEEE.

Sivencrona et al., "Protocol Membership Agreement in Distributed Communicaiton System-A Question of Brittleness", "SAE World Congress, Paper No. 2003-01-0108", 2003, pp. 1-6, Publisher: Society of Automotive Engineers Inc.

Steiner et al., "The Startup Problem in Fault-Tolerant Time-Triggered Communication", "International Conference on Dependable Systems and Networks (DSN'06)", 2006, pp. 35-44.

Steiner et al., "The Transition From Asynchronous to Synchronous System Operation: an Approach From Distributed Fault-Tolerant Systems", "Proceedings of Conference on Distributed Computing Systems", Jul. 2002, pp. 329-336, Publisher: IEEE.

Sundaram et al., "Controller Integrity in Automotive Failsafe System Architectures", "2006 SAE World Congress", 2006, pp. 1-10, Publisher: SAE International.

Tomlinson et al., "Extensible Proxy Services Framework", Jul. 2000, pp. 1-13, Publisher: Internet Society.

"Time-Triggered Protocol TTP/C", 2004, Publisher: TTTech Computertechnik GmbH, Published in: Austria.

Wensley et al., "The Design, Analysis, and Verification of the Sift Fault Tolerant System", "Proceedings of Conference on Software Engineering", 1976, pp. 458-469, Publisher: IEEE Computer Society Press.

Yeh, "Design Condiserations in Boeing 777 Fly-by-Wire Computers", "High-Asssurance Systems Engineering Symposium", Nov. 1998, pp. 64-72, Publisher: IEEE.

Yeh, "Triple-Triple Redundant 777 Primary Flight Computer", "Proceedings of the Aerospace Applications Conference", 1996, pp. 293-307, vol. 1, Publisher: IEEE, Published in: New York, NY.

* cited by examiner

METHODS FOR EXPEDITED START-UP AND CLIQUE AGGREGATION USING SELF-CHECKING NODE PAIRS ON A RING NETWORK

CROSS-REFERENCE TO RELATED APPLICATIONS

The present application is related to U.S. patent application Ser. No. 11/610,454, filed on even date herewith, entitled "SELF-CHECKING-PAIR-BASED MASTER FOLLOWER CLOCK SYNCHRONIZATION," which is also referred to here as the "'9526 application" and is incorporated herein by reference.

The present application is also related to U.S. patent application Ser. No. 11/537,305, filed on Sep. 29, 2006, entitled "SYSTEMS AND METHODS FOR FAULT-TOLERANT HIGH INTEGRITY DATA PROPAGATION USING A HALF-DUPLEX BRAIDED RING NETWORK," which is incorporated herein by reference.

The present application is also related to co-pending U.S. patent application Ser. No. 11/010,249, filed Dec. 10, 2004, entitled "SELF-CHECKING PAIR ON A BRAIDED RING NETWORK," which is referred to here as the "'249 application" and is incorporated herein by reference.

The present application is also related to co-pending U.S. patent application Ser. No. 10/994,209, filed Nov. 19, 2004, entitled "CLIQUE AGGREGATION IN TDMA NETWORKS," which is incorporated herein by reference.

The present application is also related to co-pending U.S. patent application Ser. No. 10/993,933, filed Nov. 19, 2004, entitled "HIGH INTEGRITY DATA PROPAGATION IN A BRAIDED RING," which is incorporated herein by reference.

The present application is also related to co-pending U.S. patent application Ser. No. 10/993,932, filed Nov. 19, 2004, entitled "DIRECTIONAL INTEGRITY ENFORCEMENT IN A BI-DIRECTIONAL BRAIDED RING NETWORK," which is incorporated herein by reference.

BACKGROUND

Distributed, fault-tolerant communication systems are used in applications where a failure could possibly result in injury or death to one or more persons. Such applications are referred to as "safety-critical applications." One example of a safety-critical application is in a system that is used to monitor and manage sensors and actuators included in an airplane or other aerospace vehicle. These applications can make use of various network topologies. However, networks that use a time-division multiple access (TDMA) scheme and a network topology that employs a segmented communication medium (such as a ring network topology) are vulnerable to the formation of multiple TDMA "cliques" that form when different parts of the network are powered-on at different times (for example, if two sets of fast nodes are intermingled with and separated by slow nodes).

SUMMARY

In one embodiment, a system comprises a plurality of nodes that are communicatively coupled to one another. Each of the plurality of nodes, in the absence of any faults, is communicatively coupled to at least a first neighbor node and a first neighbor's neighbor node and a second neighbor node and a second neighbor's neighbor node. When at least a first clique and a second clique exist within the plurality of nodes and a first node included in the first clique successfully receives a synchronization message associated with the second clique from the first neighbor node of the first node and the first neighbor's neighbor node of the first node, the first node does the following. The first node defects to the second clique and synchronizes to the synchronization message. The first node also communicates a join message to at least the second neighbor node of the first node and the second neighbor's neighbor node of the first node. The join message indicates that the second neighbor node and the second neighbor's neighbor node should defect to the second clique and listen for a subsequent synchronization message from the second clique to which the second neighbor node and the second neighbor's neighbor node should synchronize.

In another embodiment, a first node comprises an interface to communicatively couple the first node to a first channel that communicatively couples a plurality of nodes to on another, the plurality of nodes including the first node. When the first node is a member of a first clique and successfully receives a first synchronization message associated with a second clique on the first channel from both a neighbor node of the first node and a neighbor's neighbor node of the first node, the first node, if a priority associated with the second clique is higher than a priority associated with the first clique, does the following. The first node defects to the second clique; synchronizes to the first synchronization message; and forms a temporary self-checking pair with the neighbor node of the first node, wherein the temporary self-checking pair transmits a join message on the first channel. When the first node is a member of the first clique and successfully receives a join message on the first channel from both a neighbor node of the first node and a neighbor's neighbor node of the first node, the first node does the following. The first node defects to the second clique; forms a temporary self-checking pair with the neighbor node of the first node, wherein the temporary self-checking pair transmits a join message on the first channel; and waits for a predetermined amount of time for a second synchronization message associated with the received join message to be successfully received by the first node on the first channel from both the neighbor node of the first node and the neighbor's neighbor node of the first node. If the second synchronization message is successfully received by the first node on the first channel from both the neighbor node of the first node and the neighbor's neighbor node of the first node before the predetermined amount of time has elapsed, the first node propagates the second synchronization message on the first channel to other nodes and synchronizes to the second synchronization message.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
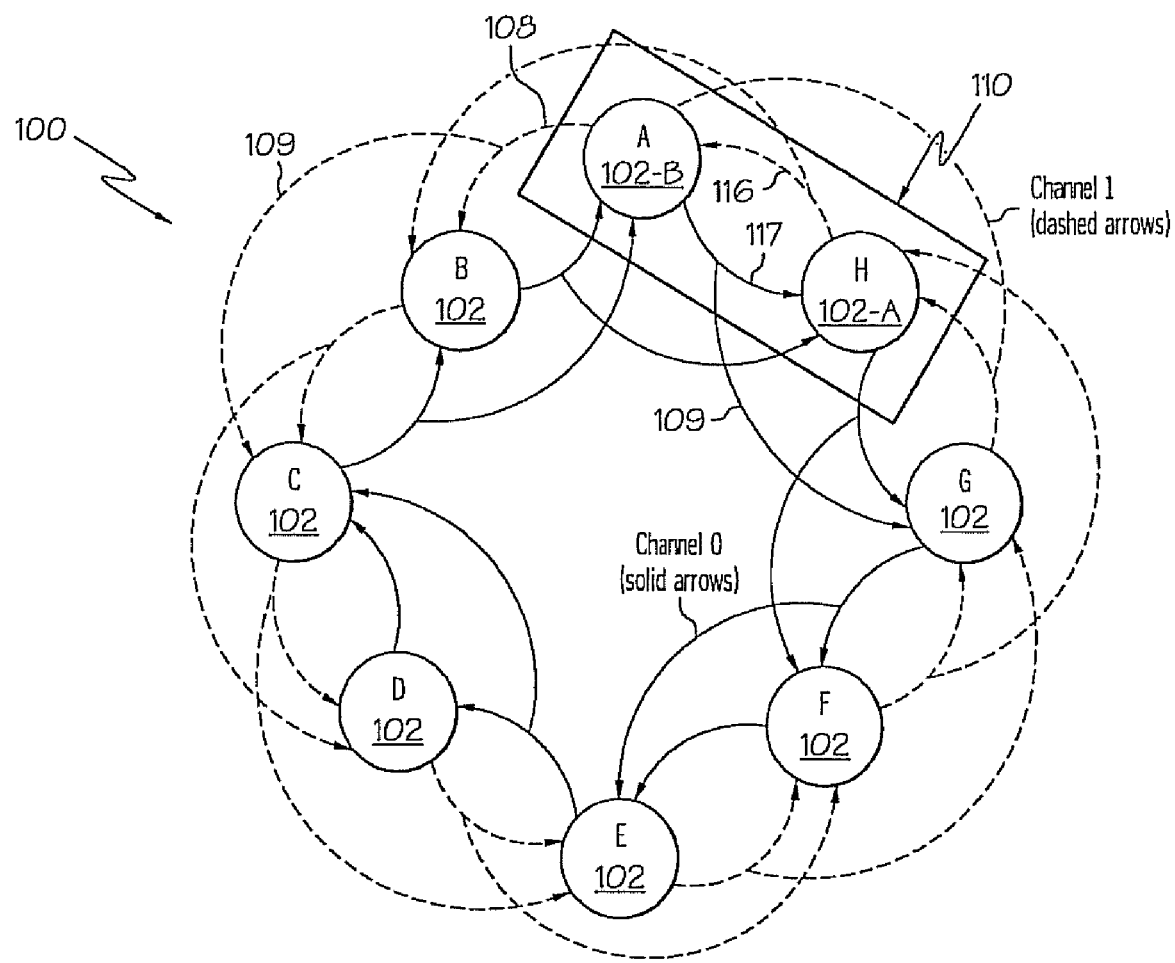
FIG. 1 is a block diagram of one embodiment of a full-duplex, bi-directional braided ring communication.

FIG. 1 is a block diagram of one embodiment of a full-duplex, bi-directional braided ring communication network 100. Communication network 100 includes multiple nodes 102 that communicate data with each other over a first channel and a second channel formed using multiple point-to-point, unidirectional serial links. As used in this application, the first channel refers to the path traveled by data propagating in the clockwise direction around network 100, while the second channel refers to the path traveled by data propagating in the counter-clockwise direction around network 100.

In the particular embodiment shown in FIG. 1, eight nodes 102 communicate with one another over the two communication channels. In other embodiments, a different number and/or type of nodes 102 and/or channels and/or a different network topology are used. Embodiments of network 100 are implemented using various media access schemes. For example, the embodiment shown in FIG. 1 is described here as being implemented using a time division multiple access (TDMA) media access. In other embodiments, other media access schemes, such as but not limited to, dynamic mini-slotting are used (for example ARINC 629).

The eight nodes 102 shown in FIG. 1 are also individually labeled in FIG. 1 with the letters "A" through "H" and are referred to here individually as "node A," "node B," and so forth. As used herein, a "neighbor node" (or just "neighbor") is a node that is immediately next to a given node 102 in the network 100. Each node 102 has two "neighbor" nodes 102, one in the clockwise direction (also referred to here as the "clockwise neighbor node" or "clockwise neighbor") and one in the counter-clockwise direction (also referred to here as the "counter-clockwise neighbor node" or "counter-clockwise neighbor"). For example, the neighbor nodes 102 for node A are node B in the clockwise direction and node H in the counter-clockwise direction.

In addition, as used herein, a "neighbor's neighbor node" (or just "neighbor's neighbor") for a given node 102 is the neighbor node 102 of the neighbor node 102 of the given node 102. Each node 102 has two neighbor's neighbor nodes 102, one in the clockwise direction (also referred to here as the "clockwise neighbor's neighbor node" or "clockwise neighbor's neighbor") and one in the counter-clockwise direction (also referred to here as the "counter-clockwise neighbor's neighbor node" or "counter-clockwise neighbor's neighbor"). For example, the two neighbor's neighbor nodes for node A are node C in the clockwise direction and node G in the counter-clockwise direction.

As shown in FIG. 1, the first channel (also referred to here as "channel 0" and shown in FIG. 1 using solid lines) interconnects the nodes 102 by propagating data in the clockwise direction around network 100 and the second channel (also referred to here as "channel 1" and shown in FIG. 1 using dashed lines) interconnects the nodes 102 by propagating data in the counter-clockwise direction around network 100. For a given direction in which data flows in a channel, the channel directly communicatively couples (that is, with only one hop) each node 102 to at least two other nodes 102 from which that node 102 receives data and to at least two other nodes 102 to which that node 102 transmits data.

Direct links 108 connect a given node 102 to that node's respective clockwise and counter-clockwise neighbor nodes. The links 109 that connect a given node 102 to that node's respective clockwise and counter-clockwise neighbor's neighbors are referred to here as "skip" links 109.

In the embodiment of network 100 described here, the normal mode comprises at least two modes—an unsynchronized mode and a synchronized mode. When operating in a synchronized mode, the nodes 102 of network 100 are synchronized to a global time base and transmit in accordance with a network communication schedule. The network communication schedule is used to determine when the nodes 102 in the network 100 transmit during a given schedule period or round. During a given schedule period, various nodes 102 in the network 100 are assigned a respective time slot in which to transmit based on the network communication schedule. In other words, for any given time slot, the node 102 assigned to that time slot is allowed to transmit during that time slot (also referred to here as the "scheduled node" 102). In one embodiment, the network communication schedule implements a TDMA access scheme.

To maintain a common notion of time with the nodes 102 of network 100 that is synchronized to the global time base, two of the nodes 102 are implemented as a self-checking pair (illustrated by 110 in FIG. 1). Self-checking-pair 110 provides synchronization messages over Channel 0 and Channel 1 to the nodes 102 of network 100. These synchronization messages are used by nodes 102 to maintain their own local time clocks in synchronization with the clocks of other nodes of network 100. Synchronous operation of the local clocks of nodes 102 ensure that only nodes assigned by the network schedule to transmit to the network during a particular time slot will do so, and, along with the guardian action (described, for example, in the '249 application), that any failure of a node is bounded.

Self-checking-pair 110 provides synchronization messages which enable the nodes 102 to maintain a common notion of time by providing offset corrections to local time clocks. Network start-up and self-checking clique aggregation, which is described below, is further provided to correct TDMA phase alignment.

As illustrated in FIG. 1, self-checking pair 110 includes a synchronizing pair comprising a first node 102-A and a second node 102-H directly coupled together by direct links 116 and 117. Each node of self-checking pair 110 generates synchronization messages used by the nodes 102 of network 100 to synchronize with each other. In the embodiment shown in FIG. 1, first node 102-A transmits a counter-clockwise propagating synchronization message via a direct link to node B and a clockwise propagating synchronization message via a skip link to node G. The second node 102-H transmits a clockwise propagating synchronization message via a direct link to node G and a counter-clockwise propagating synchronization message via a skip link to node B. The synchronization messages then propagate around the braided ring of network 100 through the direct links and skip links as described in the '933 application and the '249 application, both of which are herein incorporated by reference. In embodiments using full-duplex communication, such as network 100, the synchronization messages travel in opposite directions around the braided ring at the same time. In other embodiments employing half-duplex bi-directional links, the synchronization messages are first communicated in one direction around the ring and then are communicated in the other direction around the ring.

The first node 102-A and the second node 102-H are synchronized together so that each transmits a synchronization message at the same time instance. A rendezvous action is performed between nodes 102-A and 102-H to mutually synchronize the first node 102-A and the second node 102-H together before they start sending synchronization messages to network 100. At a known (a priori) point in time, node 102-A sends its rendezvous message to node 102-H through direct link 116 while node 102-H sends its rendezvous message to node 102-A through direct link 117. In one embodiment, the known point in time is determined by the network communication schedule, such as, but not limited to, a TDMA table. Each of the nodes 102-A and 102-H initiate their own rendezvous action based on their own internal notion of time as regulated by their own local clock 115 and the network communication schedule. The scheduling of rendezvous messages in the network communication schedule provides for a synchronization message periodicity such that any local clock offsets between nodes of network 100 is within the precision parameters required for network 100.

Reception of a rendezvous message by one of nodes 102-A and 102-H from its counterpart node of self-checking pair 110 enables the receiving node to determine the time difference between its own local clock 115 and the local clock 115 of the sending node. Using this difference, the receiving node judges on the correctness of its counterpart node by comparing the determined time difference between local clocks 115 to a known configurable reference bound. Because each node is driven based on its own local clock (i.e., a clock that is independent from the clock used by its counterpart), the comparison acts as a cross-check.

If one node of the self-checking pair 110, first node 102-A for example, determines that the difference between the local clocks 115 does not exceed the reference bound, then node 102-A judges its counterpart node (node 102-H in this example) as correct. In that case, based on the difference between the local clocks 115 and node 102-A's own local time, node 102-A calculates a sending point for transmitting a synchronization message to all of the other nodes 102 of network 100 for synchronization purposes. Similarly, when the second node 102-H also determines that the difference between the local clocks 115 does not exceed the reference bound, then node 102-H judges its counterpart node (node 102-A in this example) as correct. In that case, based on the difference between the local clocks 115 and node 102-H's own local time, second node 102-H also calculates a sending point for transmitting a synchronization message to all of the other nodes 102 of network 100 for synchronization purposes. In other implementations, additional information can be utilized to further determine whether counterpart node is correct, such as, but not limited to, whether state information from the sender of the rendezvous message agrees with corresponding state information of the node receiving the rendezvous message. For example, in one implementation each node of the self-checking pair verifies that the other is using the same network communication schedule version.

Calculation of the sending point is performed by each of nodes 102-A and 102-H in accordance to previously defined rules so that they each will derive a sending point that is closely synchronized in time with the sending point calculated by the other node of self-checking pair 110. The nodes 102-A and 102-H will both start sending their synchronization messages to all of the other nodes 102 of network 100 upon reaching the sending points, thus sending synchronization messages at nearly the same point in time. The high-integrity propagation logic (described in the '249 application) is also used to further enforce the temporal policy related to the sending of synchronization messages.

As the term is used in this application, a "synchronization message" can be either a dedicated synchronizing message or a non-dedicated synchronizing message. A dedicated synchronizing message is a message transmitted to a network for the sole purpose of providing synchronization information to one or more nodes of the network. A non-dedicated synchronizing message is any message marked for use for synchronizing purposes that also includes non synchronizing related information. In one embodiment of the present invention, any message transmitted to a network by nodes 102-A and 102-H can be utilized as a synchronization message. Network 100 is not limited to a single set of self-checking pairs, but in alternate embodiments can include a plurality of self-checking pairs, where each such self-checking pair has an associated priority. In such an embodiment, each set of self-checking pairs synchronize their own local clocks based on synchronization messages from other self-checking pairs. Also, in such an embodiment, the other nodes of the network select which synchronization messages to use based on the priority of the self-checking pair that sent the message.

The nodes 102-A and 102-H will both start sending the synchronization message to all of the other nodes 102 of network 100 upon reaching the sending point only if the calculated difference between their local clocks 115 is less than or equal to the reference bound. If one node of self-checking pair 110 determines that the difference between the local clocks 115 exceeds the reference bound, then that node judges its counterpart node as incorrect and refrains from sending a synchronization message at the sending point.

When both nodes of self-checking pair 110 send synchronization messages at approximately the same point in time, the full-coverage propagation logic in the ring of network 100 assures that each node 102 gets synchronization messages with checked integrity (discussed below), and according to the normal propagation pattern of the ring network as described in the '933 application and the 249 application, both of which are herein incorporated by reference. For example, a nearest node 102 will receive the synchronization message one repeat sample behind its upstream neighbor, the neighbor's neighbor will receive the synchronization message two repeat samples behind, and so forth down the channel.

When a received synchronization message is accompanied by a corresponding synchronization message from the synchronization pair, the receiving nodes 102 in network 100 can use the synchronization messages as a reference for synchronizing their own local clocks. When one node of nodes 102-A and 102-H disagrees with its counterpart node, nodes 102 will not receive a synchronization message based on information from that node, indicating to nodes 102 that at least one node of self-checking pair 110 is potentially faulty and cannot be trusted for use as a time reference.

In the embodiment of network 100, the instant of a synchronizing message's send time is used by nodes 102 in network 100 as a reference for setting their own internal clocks. Each of nodes 102 calculate the instant in time at which the synchronization message was transmitted onto network 100 by one of nodes 102-A and 102-H by deducting the propagation time (which is a priori known) from the instant in time at which they receive the synchronization message. In one embodiment, the a priori known propagation delay times between nodes of the network are stored as part of the network communication schedule. For example, when node E receives a synchronization message on channel 0 from node H, node E knows that the synchronization message had to propagate clockwise through node G and node F to arrive at node E. Node E therefore receives the synchronization message two repeat samples behind node G and one repeat sample behind node F. Thus, node E deducts the propagation time associated with two repeat samples from the instant in time it received the synchronization message to determine the instant in time at which the synchronization message was transmitted to channel 0 by node 102-A. Similarly, when node E receives a synchronization message on channel 1 from node A, node E knows that the synchronization message had to propagate counter-clockwise through nodes B, C and D to arrive at node E. Thus, node E knows that the synchronization message was received after a propagation delay of three repeat samples and accordingly deducts the propagation time associated with three repeat samples from the instant in time it received the synchronization message to determine the instant in time at which the synchronization message was transmitted to channel 1 by node 102-H.

In the case were nodes 102-A and 102-H of self-checking pair 110 both judge their counterpart node as incorrect, the result is that no synchronization message is sent from either of node 102-A or node 102-H. In that case, the nodes 102 of network 100 will not receive any synchronization message from self-checking pair 110.

In the case where only one of nodes 102-A and 102-H judges its counterpart node as incorrect only one synchronizing message is sent by the node that deemed its counterpart reliable. In one embodiment, the nodes directly adjacent to the nodes of self-checking pair 110 operate as "guardians" and are configured to only propagate data symbols received via a direct link, during timeslots where self-checking pair 110 are scheduled to send data based on the network communication schedule. Further details regarding the operation of "guardians" are provided in the '936 application and '931 application, herein incorporated by reference. Therefore, the guardian node that receives the one synchronizing message via its direct link will propagate the synchronizing message to its neighbor node and neighbor's neighbor node. Meanwhile, the guardian node that receives the one synchronizing message via its skip link will not propagate the synchronizing message. The result is that one synchronizing message will propagate through only one channel of network 100. Accordingly, nodes 102 of network 100 will receive only a single synchronization message which will not be deemed reliable because the synchronization message from one channel was not accompanied by a synchronization message on the other channel.

In contrast, when both nodes 102-A and 102-H of self-checking pair 110 send a synchronization message at approximately the same point in time, each node 102 will get the synchronization messages from both the first and second channels, and the synchronization messages are each thus deemed to have been transmitted from a reliable pair of nodes. Moreover, the integrity reconstitution functionality described in the '933 application can also be used with such synchronization messages (as described in more detail below).

Even when an accurate synchronizing message is transmitted by a node onto a channel of network 100, the possibility exists that the message might become corrupted while propagating through network 100 to the receiving node 102. Therefore, in addition to determining whether a pair of accurate synchronizing messages was originally transmitted by self-checking pair 110, a node 102 of network 100 can also decide whether to trust a received synchronizing message based on the integrity of the synchronizing message as it was received by the node 102.

Determining the integrity of a message propagating through a braided ring network is described in greater detail in the '933 application and the '249 application, both of which are herein incorporated by reference. This provides a mechanism to determine if a message has been "successfully received" by a given node. In summary, high-integrity data propagation through a braided ring network is achieved as follows. A message is received on a channel of network 100 with "checked integrity" when a node receives the identical message from both the direct link and skip link of that channel. In that case, in one embodiment, a node then sets an "integrity field" in the message before continuing propagation of the message around the ring. For example, node E receives a synchronization message on channel 0 with integrity when it receives a synchronization message with checked integrity on the direct link from node F and an identical synchronization message with checked integrity on the skip link from node G. Similarly, node E receives a synchronization message on channel 1 with integrity when it receives a synchronization message with checked integrity on the direct link from node D and an identical synchronization message with checked integrity on the skip link from node C. An absence of integrity may also be indicated by the reception of a truncated message.

When node E receives a synchronization message on channel 0 and a corresponding synchronization message on channel 1, both marked with integrity, node E can assume that accurate synchronization messages were transmitted onto network 100 by both nodes of self-checking pair 110, and further assume that it has received the pair of synchronization messages uncorrupted. In this case, node E can use the synchronization messages to correct its local clock as described above.

When node E receives a synchronization message on only one of channel 0 or channel 1 with marked integrity, node E can also use the synchronization messages to correct its local clock because the synchronization message received with integrity incorporates the behavior of both halves of the self-checking pair 110.

When node E receives only a single synchronization message on either one of channel 0 or channel 1 without marked integrity, node E assumes that an accurate synchronization message was not transmitted onto network 100 by one of node 102-A or 102-H and will not use the single synchronization message to correct its local clock.

In the case where node E receives synchronization messages on both channel 0 and channel 1, and neither is marked with integrity, node E can assume that accurate synchronization messages were initially transmitted onto network 100 by nodes 102-A and 102-H, and that integrity reconstitution (described in greater detail below) may be possible. When integrity reconstitution is possible, node E can use the synchronization messages to correct its local clock as described above.

As previously mentioned, synchronization message provided by self-checking pair 110 can be either dedicated synchronizing messages or non-dedicated synchronizing message. A dedicated synchronizing message is a message transmitted to a network for the sole purpose of providing synchronization information to one or more nodes of the network. A non-dedicated synchronizing message is any message marked for use for synchronizing purposes that also includes non synchronizing related information.

In alternate embodiments, other types of links are used to implement direct link and skip link. For example, in one such other embodiment, bidirectional links are used and the devices, systems, and techniques described here are performed for each direction in which communications occur. In case of bidirectional links, each link is able to send messages in only one direction at any one time. Accordingly, the sending of synchronization messages on channel 0 and channel 1 must be temporally shifted. For example, in one half-duplex network with bidirectional links, a first synchronization message is first sent clockwise around the network on channel 0 by one of the self-checking pair. Then, a second synchronization message is sent counter-clockwise around the network on channel 1 by the other of the self-checking pair. In one such embodiment, a receiving node waits for a pre-determined period of time after receiving the first synchronization message for the reception of the second synchronization message, before it calculates any corrections.

FIGS. 2A-2F show a flow diagram of one embodiment of a method 200 of resolving cliques. This embodiment of method 200 is described here as being implemented in a full-duplex braid-ring network of the type and that employs self-checking pairs that transmit synchronization messages as described above in connection with FIG. 1. Method 200 is suitable for use when the nodes 102 in the ring 104 are operating in a synchronized mode in which two or more cliques have formed. In the embodiment described here in connection with FIGS. 2A-2F, each self-checking pair has an associated priority, and each synchronization message transmitted by a self-checking pair includes information indicative of the priority of the self-checking pair that transmitted the synchronization message.

In the context of FIGS. 2A-2F, the node 102 that is performing the processing of method 200 is referred to here as the "current" node 102. In one embodiment, at least a portion of the functionality described here as being performed by the current node 102 is implemented in a controller included in the node 102. Other embodiments of method 200 are implemented in other ways.

If the current node 102 has not received a "valid" frame from one of its neighbor nodes for a certain amount of time (for example, one TDMA round) (block 202 of FIG. 2A), the current node 102 listens asynchronously for data from such a neighbor and such a neighbor's neighbor (block 204). Such a neighbor node is also referred to here as a "silent neighbor." A "valid" frame, in this context, is a frame that is syntactically correct and that is in agreement with the TDMA schedule that the current node is currently using (that is, the TDMA schedule for the clique of which the current node 102 is currently a member). In one embodiment, schedule agreement may be validated by explicit schedule data transmitted within the contents of each frame. In another embodiment, the schedule agreement data may be sent implicitly in the contents of a frame (for example, as described in U.S. patent application Ser. No. 10/993,162, filed Nov. 19, 2004, titled "MESSAGE ERROR VERIFICATION USING CHECKING WITH HIDDEN DATA", which is hereby incorporated by reference herein).

When the current node 102 listens asynchronously for data from a silent neighbor and from a silent neighbor's neighbor, the current node 102 will be able to receive any syntactically valid frame sent from the silent neighbor or the silent neighbor's neighbor irrespective of transmission time or phase. As result, the current node 102 will be able receive messages from a clique of which the current node 102 is not currently a member.

Figure 2A:
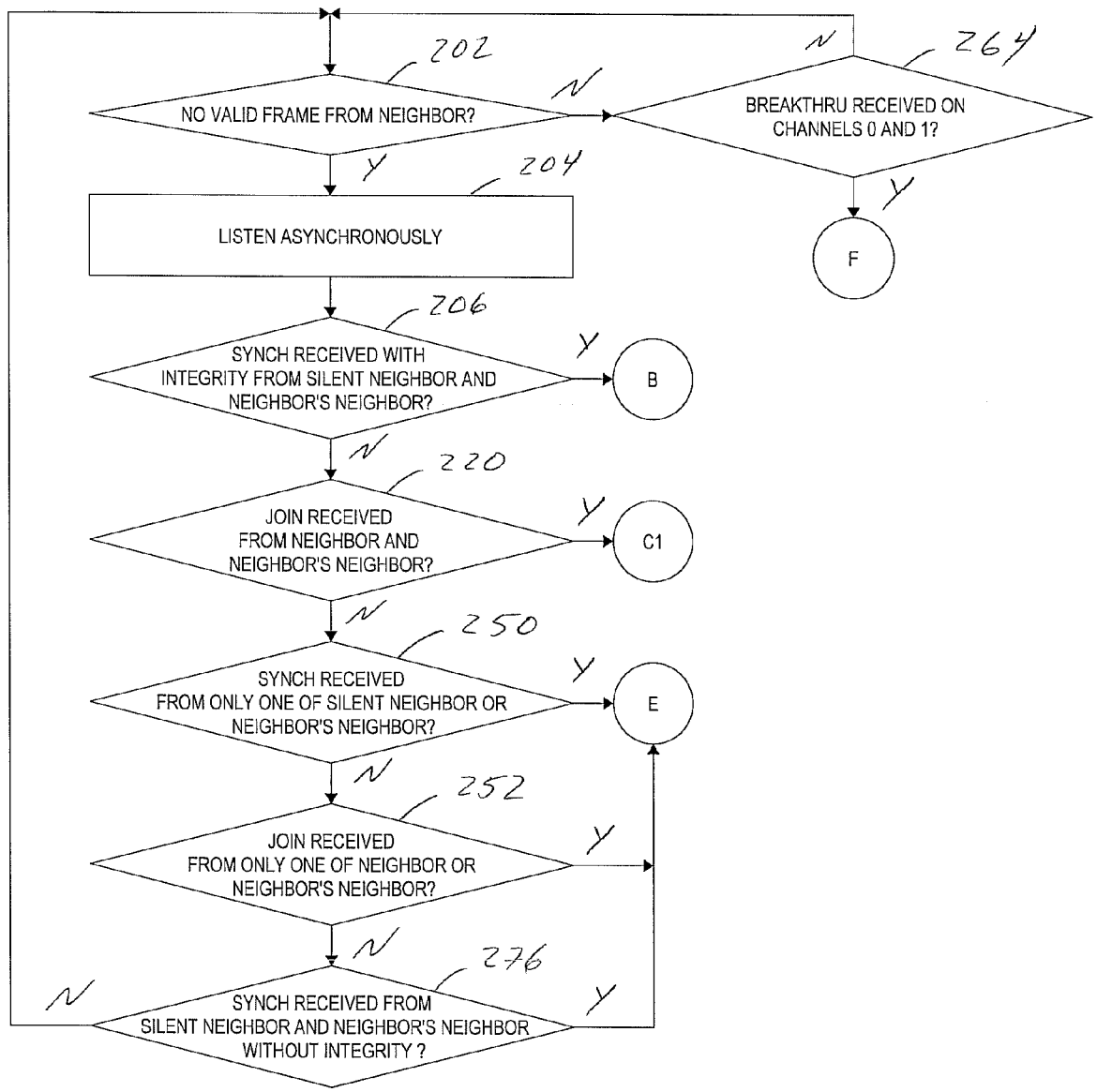
FIGS. 2A-2F show a flow diagram of one embodiment of a method of resolving cliques.
Figure 2B:
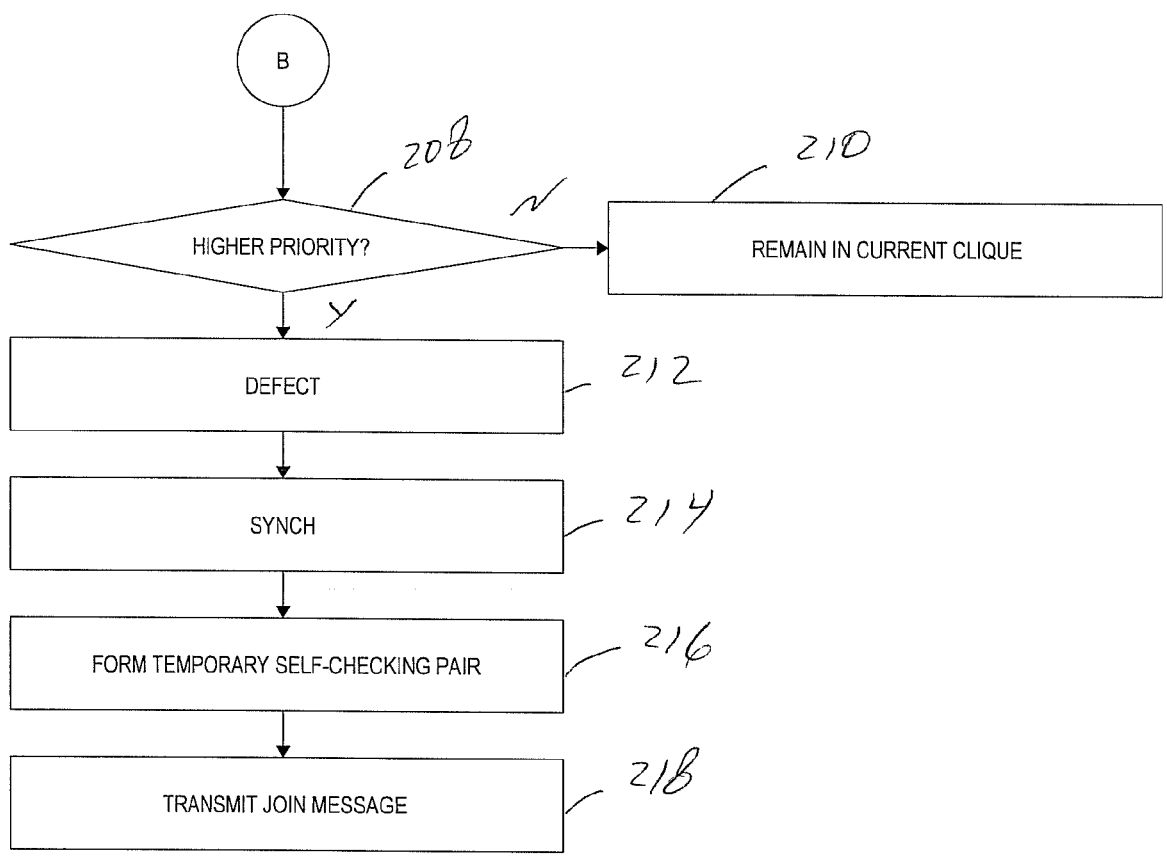
Figure 2C:
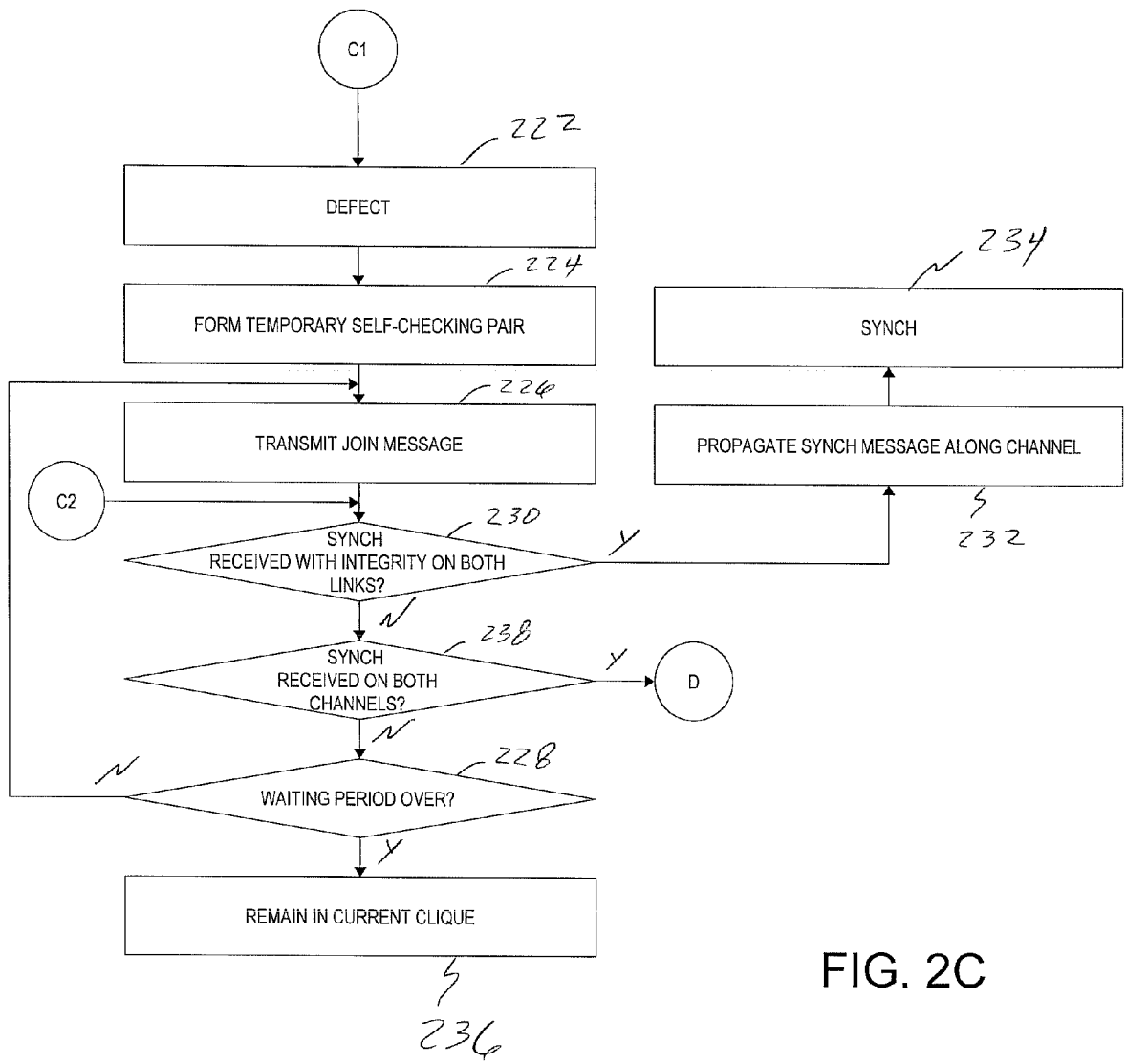

If the current node 102 receives with integrity the same synchronization message from the silent neighbor and the silent neighbor's neighbor (block 206), the current node 102 checks if the priority associated with the self-checking pair that transmitted the message is higher than the priority associated with the master self-checking pair for the current node's current clique (block 208 of FIG. 2B). Whether or not the same synchronization message is received by the current node 102 from both the silent neighbor and the silent neighbor's neighbor is determined by a bit-for-bit comparison of data received by the current node 102 from the silent neighbor and from the silent neighbor's neighbor. A message is "received with integrity" if the message is syntactically valid and does not contain a flag (or other indication) that a miscompare occurred at any previous "upstream" node during propagation of the message to the current node 102.

If the current node 102 receives with integrity the same synchronization message from the current node's silent neighbor and the silent neighbor's neighbor but the priority associated with the self-checking pair that transmitted the message is not higher than the priority associated with the master self-checking pair for the current node's current clique, the current node 102 remains in its current clique (block 210).

If the current node 102 receives with integrity the same synchronization message from the current node's silent neighbor and the silent neighbor's neighbor and the priority associated with the self-checking pair that transmitted the message is higher than the priority associated with the master self-checking pair for the current node's current clique, the current node 102 immediately defects to the clique that the transmitting self-checking pair is member of (block 212) and synchronizes itself to the received synchronization message (block 214). Also, the current node 102 forms a temporary self-checking pair with the silent neighbor (block 216). Both nodes of the temporary self-checking pair (the current node 102 and its silent node) transmit a special "join message" along the channel from which the current node 102 received the synchronization message (block 218). Both nodes form the temporary self-checking pair and transmit the join message for a predetermined amount of time. In one implementation of such an embodiment, the predetermined amount of time is slightly less than the amount of time until the next synchronization message is to be transmitted from the transmitting self-checking pair. This amount of time is also referred to here as the "defection period". The join message includes information indicative of the self-checking pair that transmitted synchronization message and the clique associated with that self-checking pair. The join message, in one implementation, also includes a count-down delay field that includes information indicative of how much time is left in the current defection period.

If the current node 102 receives the same join message from a silent neighbor and a silent neighbor's neighbor (block 220 of FIG. 2A), the current node 102 immediately defects to the clique that is identified in the joint message (block 222). The current node 102 also forms a temporary self-checking pair with the neighbor from which the current node 102 received the join message (block 224). Both nodes of the temporary self-checking pair (the current node 102 and its neighbor) transmit a copy of the join message along the channel from which the current node 102 received the join message (block 226) and waits, for a predetermined amount of time, for the next synchronization message from a self-checking pair associated with the join message (blocks 228). Both nodes form the temporary self-checking pair and transmit the join message for a predetermined amount of time. The predetermined amount of time (also referred to here as the "waiting period") is at least as long as the amount of time remaining in the current defection period associated with the join message (that is, at least until the next synchronization message is scheduled to be transmitted from the self-checking pair associated with the join message).

When the next synchronization message transmitted by the self-checking pair associated with the join message is received with integrity by the current node 102 on both the direct link and skip link for either channel (block 230), the current node 102 propagates the synchronization message along the channel from which it was received (block 232) and synchronizes itself to the received synchronization message (block 234). When propagating the synchronization message, the current node 102 increments the hop count field of the synchronization message by one as noted above. It is to be understood that the current node 102 immediately propagates the synchronization message (that is, a "stored-and-forward" approach is not used to propagate the synchronization message). If the waiting period elapses without receipt of synchronization message as described above, the current node 102 remains in the current clique (block 236).

The clique aggregation processing described in connection with blocks 202-236 of method 200 will resolve relatively rapidly and will tolerate a single benign fault in some situations. In order to enable such clique aggregation processing to resolve in the face of multiple benign faults in some situations, the embodiment shown in FIGS. 2A-2F employs the "integrity reconstitution" features of the braided ring topology (which is described in the '933 application). Also, in the embodiment shown in FIGS. 2A-2F, each synchronization message includes a "hop count" field, which is set to zero by the node that originates that message. Then, each node that receives and relays the synchronization message updates the hop count. Each such node increments the hop count field by one if that node received the same synchronization message on both a direct and skip link of the relevant channel, resets the hop count field to one if the synchronization message is received by that node on only its direct link for the relevant channel, and resets the hop count field to two if the synchronization message is received by that node on only its skip link for the relevant channel. The hop count field is used to determine if a synchronization message originated from a self-checking pair or from a single faulty node. In other embodiments, other techniques are used to determine if a given message is source from a single node or a self-checking pair (for example, "identifier stamping" each such message with an identifier associated with the source of the message).

For example, in the embodiment shown in FIGS. 2A-2F, such integrity reconstitution features can be used with the processing described above in connection with FIG. 2C. While the current node 102 is waiting for the next synchronization message to be transmitted by the self-checking pair associated with the join message, if the current node 102 receives without integrity a synchronization message from the self-checking pair associated with the join message on both channels (block 238 of FIG. 2C), the current node 102 performs a bit-for-bit comparison of the two received synchronization messages (block 240 of FIG. 2D). This bit-for-bit comparison ignores the contents of each message's hop count field. If the bit-for-bit comparison does not result in a match (that is, the same synchronization message was not received on channel 0 and channel 1) (block 242), the current node 102 remains in its current clique (block 244). If the bit-for-bit comparison results in a match (that is, the same synchronization message was received on channel 0 and channel 1), the current node 102 then adds the value contained in the hop count field in both messages together (block 246). If this sum is not equal to N−1 (where N equals the number of nodes in the braided-ring network) (checked in block 248), the synchronization message was not transmitted by a self-checking pair and is not used by for clique aggregation (or for clock synchronization) and the current node 102 remains in its current clique (block 244). If the sum is equal to N−1, the current node 102 considers the synchronization messages to be valid and synchronizes itself to the received synchronization message (block 249).

Figure 2D:
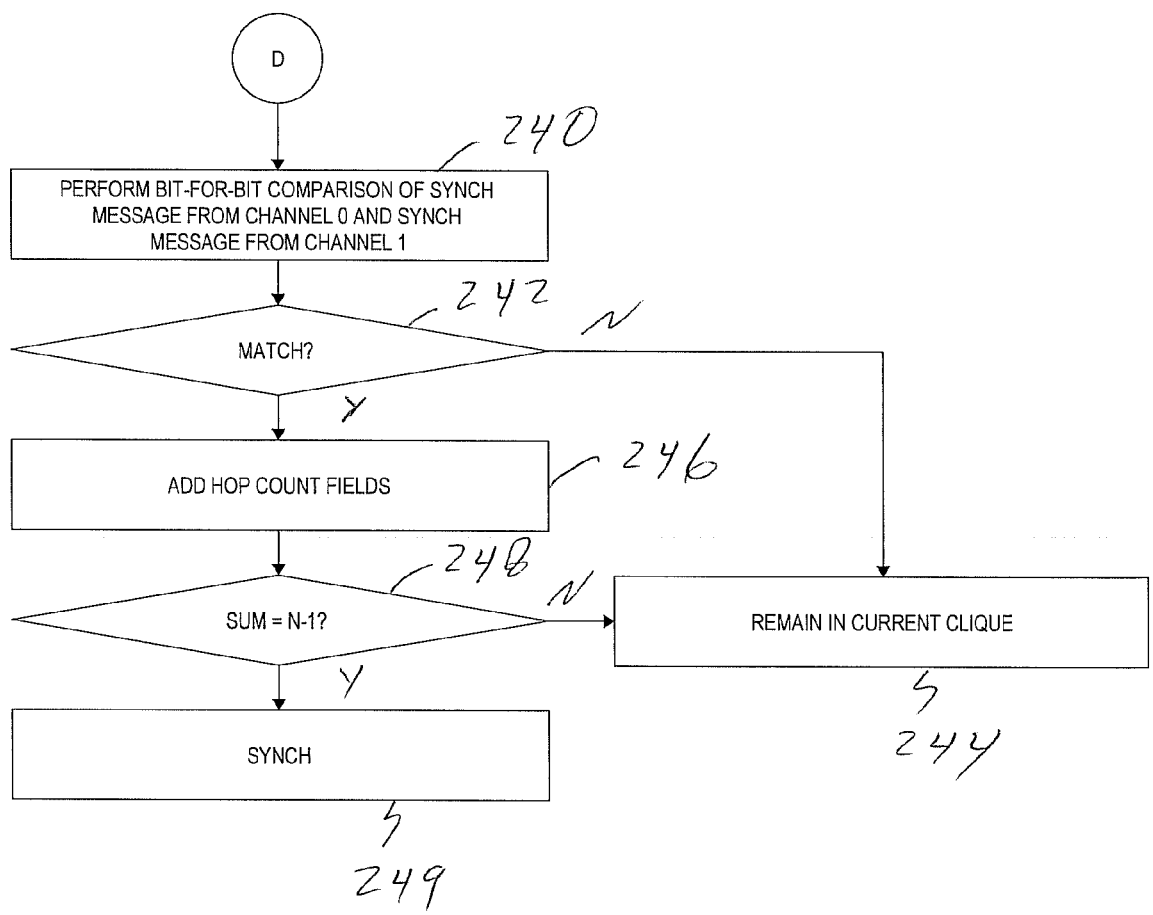
Figure 2E:
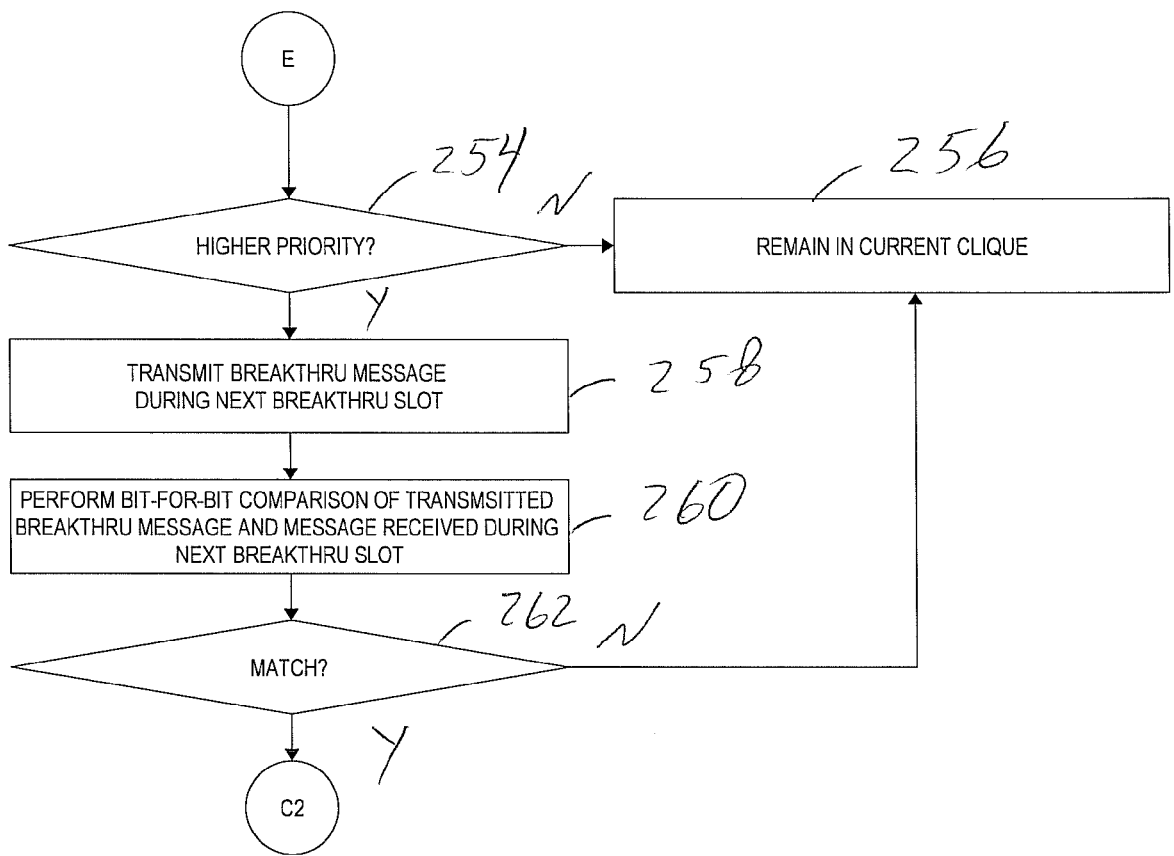
Figure 2F:
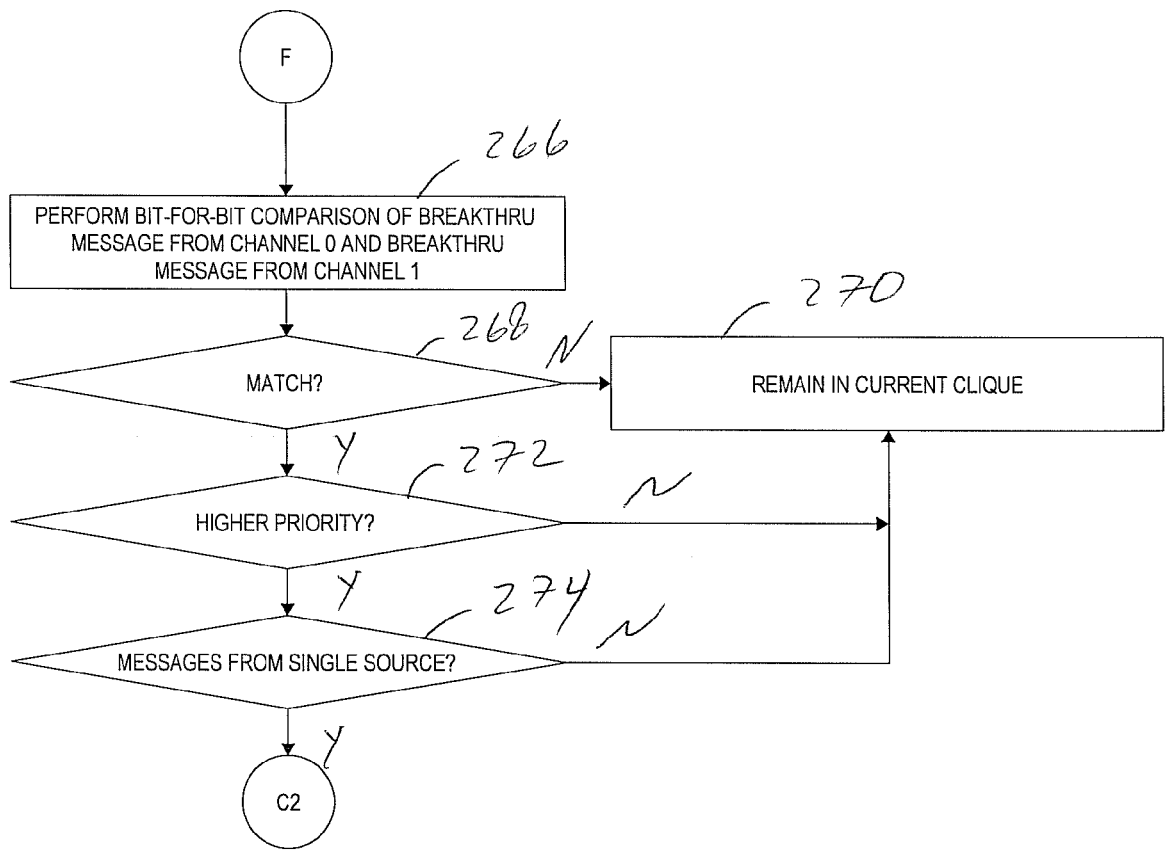

Also, in the embodiment shown in FIGS. 2A-2F, such integrity reconstitution features are used by the frontier nodes as shown in FIG. 2E. In such an embodiment, the TDMA schedule used by each clique includes at least one timeslot that can be used for clique aggregation purposes. Such a timeslot is referred to here as a "break through" slot.

If, when the current node 102 listens asynchronously for data from a silent neighbor and from a silent neighbor's neighbor, the current node 102 receives a synchronization message from only one of the silent neighbor or the silent neighbor's neighbor (block 250 of FIG. 2A) or receives a synchronization message from both the silent neighbor and the silent neighbor's neighbor but does not receive it with integrity (block 252), the current node 102 checks if the priority associated with the self-checking pair that transmitted the received synchronization message is higher than the priority associated with the master self-checking pair for the current node's current clique (block 254 of FIG. 2E). If the priority is not higher, the current node 102 remains in the current clique (block 256). If the priority is higher, the current node 102 transmits a special message (referred to here as a "breakthrough message") during the next break-through slot along the same channel from which it was received (block 258). In one implementation, the breakthrough message contains essentially the same information as a join message (for example, the priority of the self-checking pair that sourced the associated synchronization message, an identifier associated with the source of the breakthrough message, and/or additional information used to determine if two such messages were sourced from the same node (such as a hop count field or an identifier stamp). Then, the current node 102 performs a bit-for-bit comparison of the breakthrough message transmitted by the current node 102 and any message received on the other channel during that break-through slot (block 260). This bit-for-bit comparison ignores the contents of each message's hop count field (or other field used for validating that each message was not sourced from a single node). If the bit-for-bit comparison does not result in a match (that is, the transmitted breakthrough message does not match the received message) (block 262), the current node 102 remains in its current clique (block 256). If the bit-for-bit comparison results in a match, the current node 102 considers the synchronization message to be valid and performs the processing described above in connection blocks 230-249 of FIGS. 2C-2D.

In such an embodiment, receipt of breakthrough messages from both channels 0 and 1 can also cause any node that propagates such breakthrough messages to possibly defect from its current clique. As shown in FIG. 2A, if the current node 102 receives a breakthrough message on both channel 0 and channel 1 during the breakthrough slot (block 264), the current node 102 performs a bit-for-bit comparison of the breakthrough message from channel 0 and the breakthrough message from channel 1 (block 266 of FIG. 2F). This bit-for-bit comparison ignores the contents of each message's hop count field (or other field used for validating that each message was not sourced from a single node). If the bit-for-bit comparison does not result in a match (that is, the same breakthrough message was not received on channel 0 and channel 1) (block 268), the current node 102 remains in its current clique (block 270). If the bit-for-bit comparison results in a match (that is, the same breakthrough message was received on channel 0 and channel 1), the current node 102 checks if the priority associated with the breakthrough message is higher than the priority associated with the master self-checking pair for the current node's current clique (block 272). If the priority is not higher, the current node 102 remains in the current clique (block 270). If the priority is higher, the current node 102 checks if the two received breakthrough messages were received from a single node (for example, by checking the identifier stamps included in each breakthrough message or by adding hop count fields) (block 274). If the two received breakthrough messages were received from a single node, the current node 102 remains in its current clique (block 270). If the two received breakthrough messages were not received from a single node, the current node 102 performs the processing described above in connection blocks 230-249 of FIGS. 2C-2D.

Also, similar integrity reconstitution processing can be performed for other types of messages (for example, the join messages). One example is illustrated starting at block 276 in FIG. 2A.

One example of the operation of method 200 is illustrated in FIGS. 3A-3F. In this example, the network comprises a full-duplex braided ring having 12 nodes (labeled node A, B, C, D, E, F, G, H, I, J, K, and L). Also, in this example, two cliques have formed—clique 1 and clique 2. Nodes C and D are configured as a self-checking pair (also referred to here as "self-checking pair CD") that serves as the synchronization master for clique 1. Nodes J and I are configured as a self-checking pair (also referred to here as "self-checking pair JI") that serves as the synchronization master for clique 2. In this example, self-checking pair CD (and clique 1) has a higher priority than self-checking pair JI (and clique 2).

In the example shown in FIGS. 3A-3F, for the sake of simplicity, only those links over which a particular message is being communicated are shown.

In this example, nodes A and F are frontier nodes for clique 1. As a result, node A will not receive valid frames (that is, frames that were transmitted in accordance with the TDMA schedule used by clique 1) from nodes L and K on channel 0, and node F will not receive valid frames from nodes G and H on channel 1. As a result, nodes A listens asynchronously to channel 0 and node F listens asynchronously to channel 1. Likewise, in this example, nodes L and K are frontier nodes for clique 2. As a result, node G will not receive valid frames (that is, frames that were transmitted in accordance with the TDMA schedule used by clique 2) from nodes F and E on channel 0, and node L will not receive valid frames from nodes A and B on channel 1. As a result, nodes G listens asynchronously to channel 0 and node L listens asynchronously to channel 1.

Figure 3A:
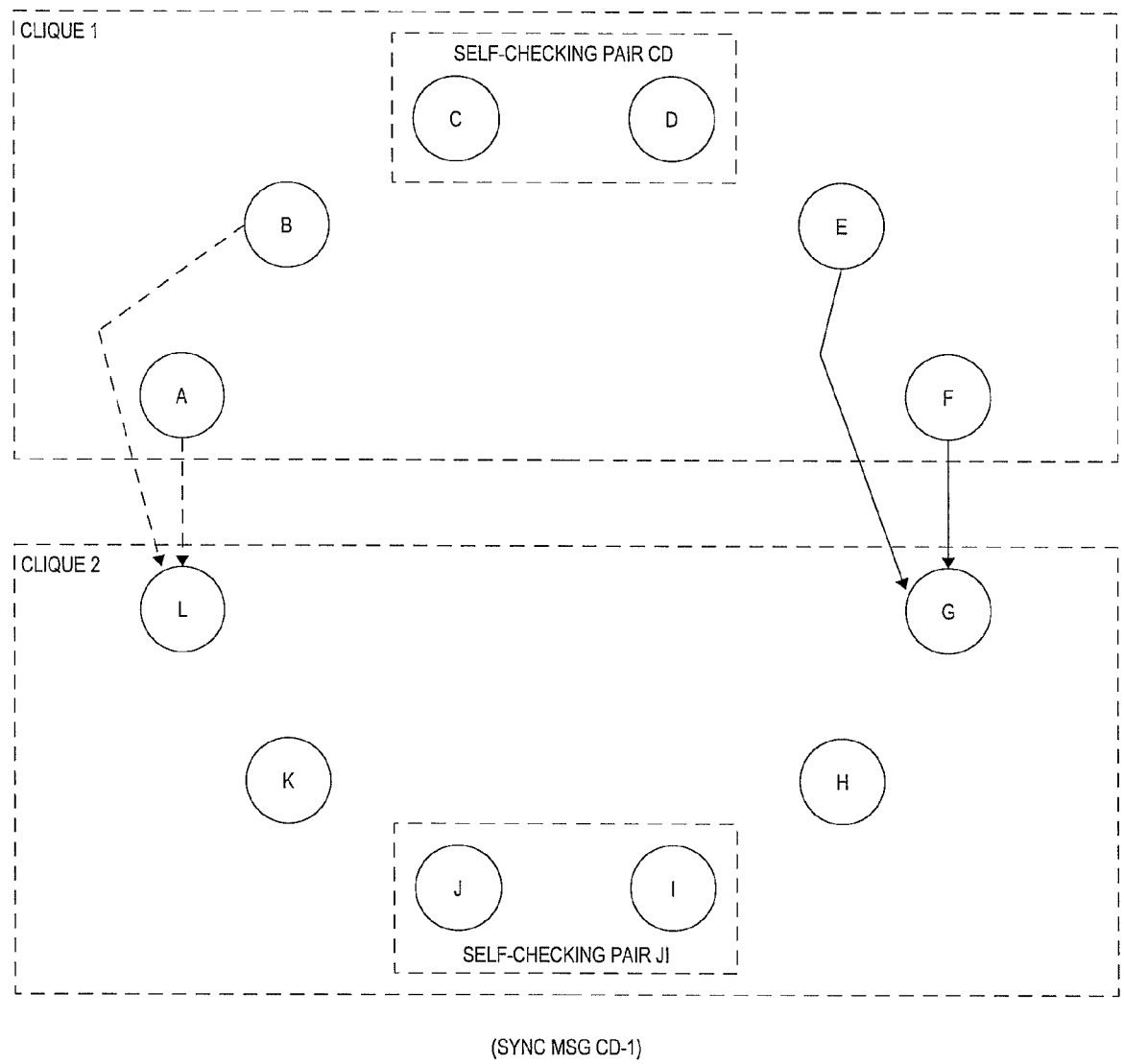
FIGS. 3A-3F illustrates one example of the operation of the method shown in FIGS. 2A-2F.

As shown in FIG. 3A, assuming there are no faults, when the self-checking pair CD sends synchronization message CD-1 on both channels 0 and 1 around the ring, the message CD-1 will eventually propagate to node G (via nodes E and F). Because node G is a frontier node that will not receive valid frames (from the perspective of clique 2) from node F, node G will be listening asynchronously to channel 0 (and, as result, nodes E and F) and will receive synchronization message CD-1 from nodes E and F. In this example, node G receives both instances of the synchronization message CD-1 with integrity. Because the priority indicated in synchronization message CD-1 is higher than the priority associated with self-checking pair JI, node G immediately defects to clique 1, forms a temporary self-checking pair with node F (shown in FIG. 3B), which starts sending join messages into clique 2 along channel 0 for the duration of the defection period (though for the sake of simplicity of illustration this is only shown in FIG. 3B).

Because node L is a frontier node that will not receive valid frames (from the perspective of clique 2) from node A, node L will be listening asynchronously to channel 1 (and, as result, nodes A and B) and will receive synchronization message CD-1 from nodes A and B. In this example, node L receives both instances of synchronization message CD-1 with integrity. Because the priority indicated in synchronization message CD-1 is higher than the priority associated with self-checking pair JI, node L immediately defects to clique 1, synchronizes to the received synchronization message, forms a temporary self-checking pair with node A (shown in FIG. 3B), which starts sending join messages into clique 2 along channel 1 for the duration of the defection period (though for the sake of simplicity of illustration this is only shown in FIG. 3B).

Figure 3B:
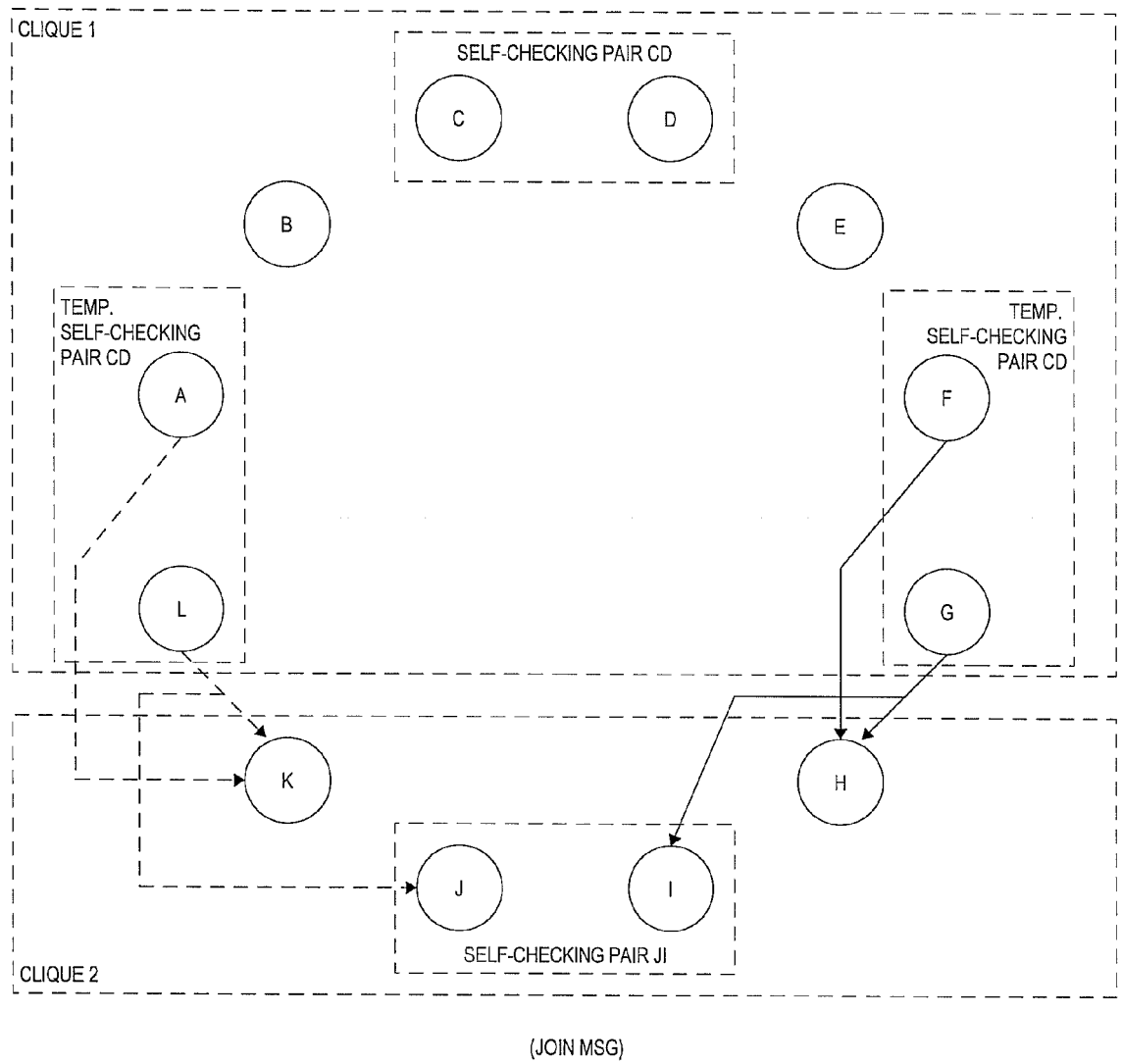
Figure 3C:
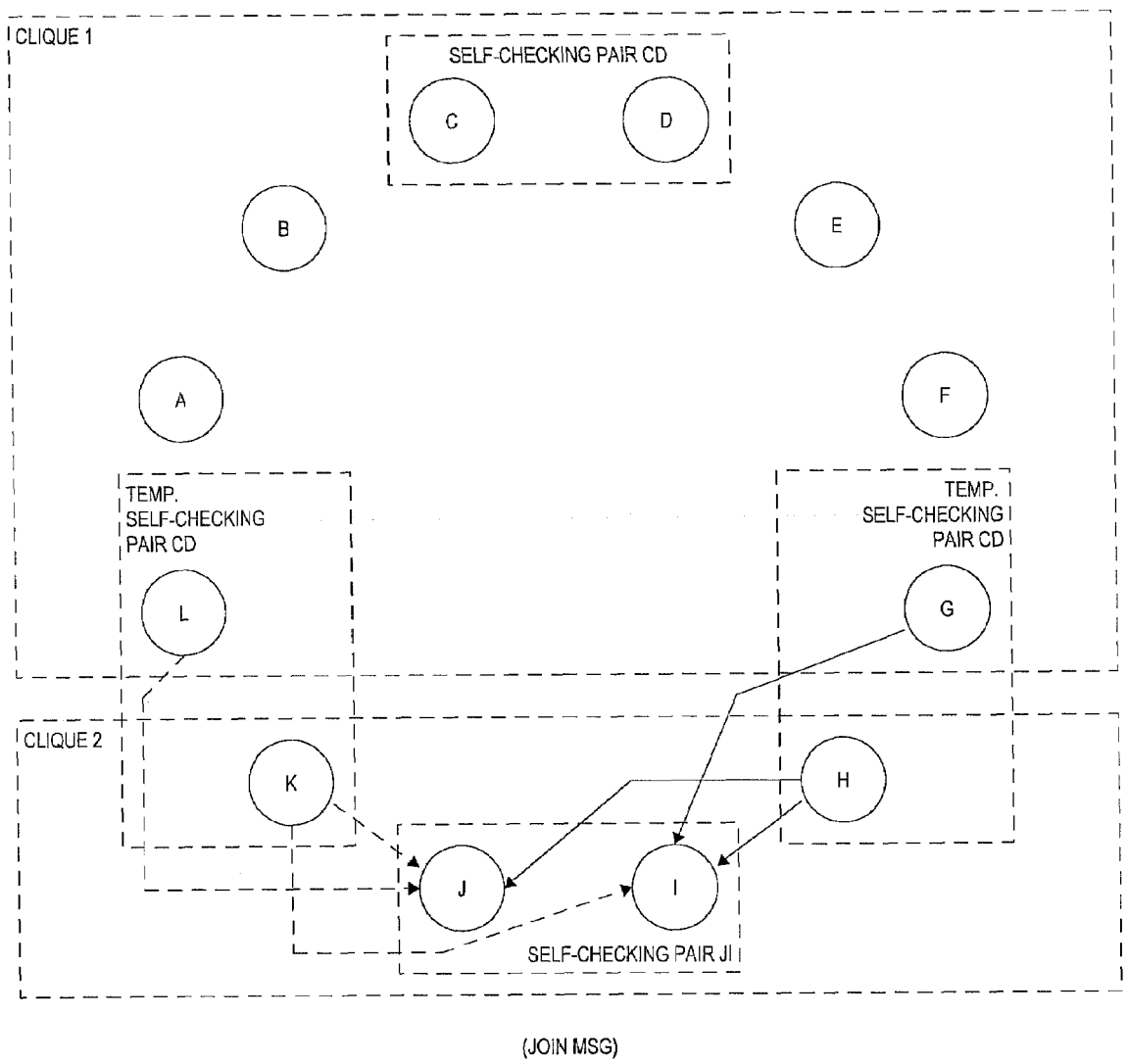

As shown in FIG. 3B, node H receives a copy of the join message on channel 0 from both node F and node G. In this example, node H receives both instances of the join message and immediately defects to clique 1. As shown in FIG. 3C, node H forms a temporary self-checking pair with node G that transmits the join message along channel 0. The self-checking pair transmits the join message from node H to node I (via the direct link coupled to nodes H and I) and to node J (via the skip link coupled to nodes H and J) and from node G to node I (via the skip link coupled to nodes node G and I). For the sake of simplicity of illustration, this temporary self-checking pair is only shown in FIG. 3C. For the predetermined waiting period, node H waits to receive the next synchronization message from self-checking pair CD.

Also, as shown in FIG. 3B, node K receives a copy of the join message on channel 1 from both node A and node L. In this example, node K receives both instances of the join message and immediately defects to clique 1. As shown in FIG. 3C, node K forms a temporary self-checking pair with node L that transmit the join message along channel 1. The self-checking pair transmits the join message to node J (via the direct link coupled to nodes K and J) and to node I (via the skip link coupled to nodes K and I) and from node L to node J (via the skip link coupled to nodes L and J). For the sake of simplicity of illustration, this temporary self-checking pair is only shown in FIG. 3C. For the predetermined waiting period, node K waits to receive the next synchronization message from self-checking pair CD.

Along channel 0, nodes I and H, nodes J and I, nodes K and J, will successively form temporary self-checking pairs to transmit a join message along channel 0 within clique 2. Along channel 1, nodes J and K, nodes I and J, nodes H and I will successively form temporary self-checking pairs to transmit a join message along channel 1 within clique 2. Also each of the nodes H, I, J, and K will defect to clique 1.

Figure 3D:
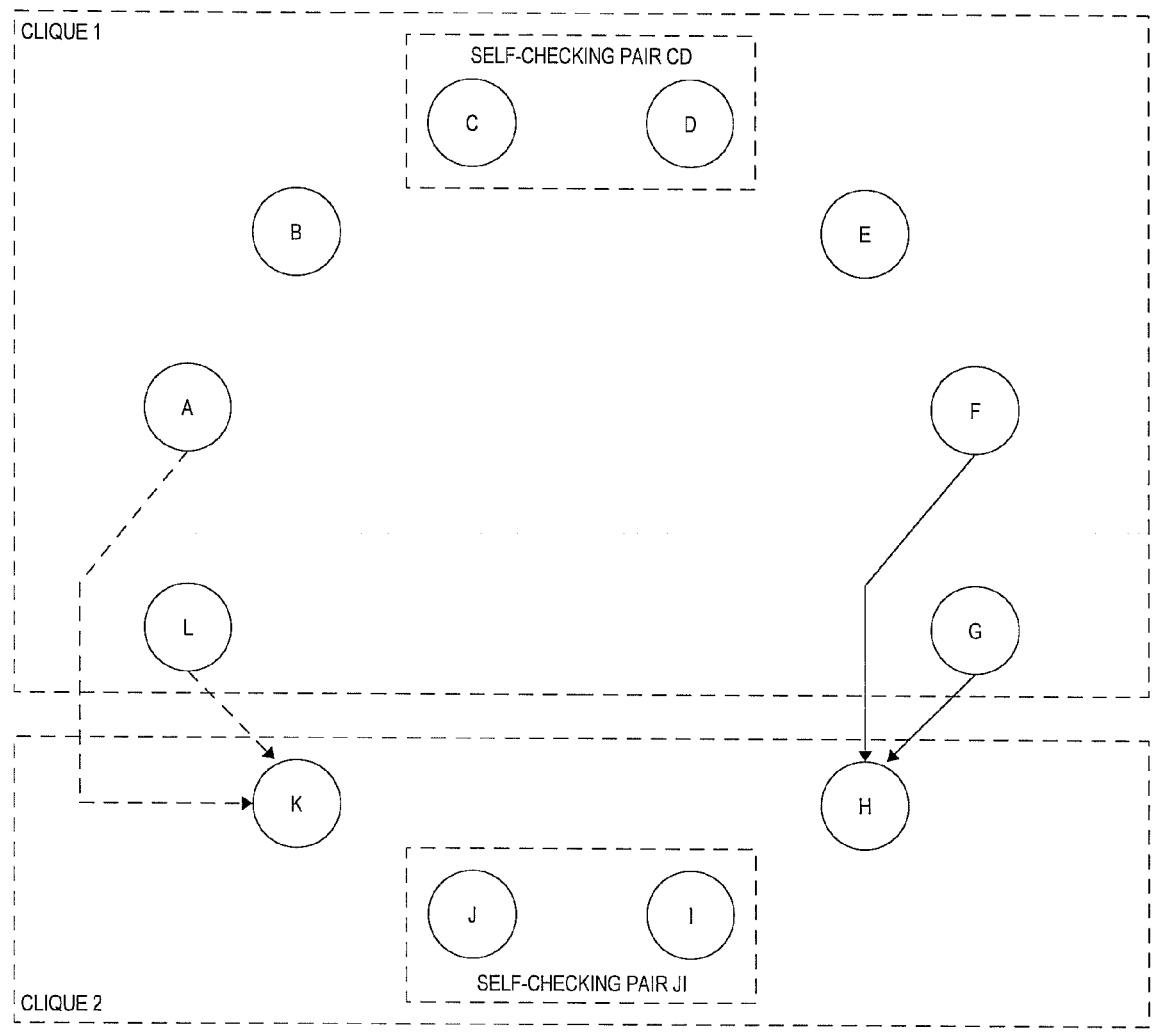
Figure 3E:
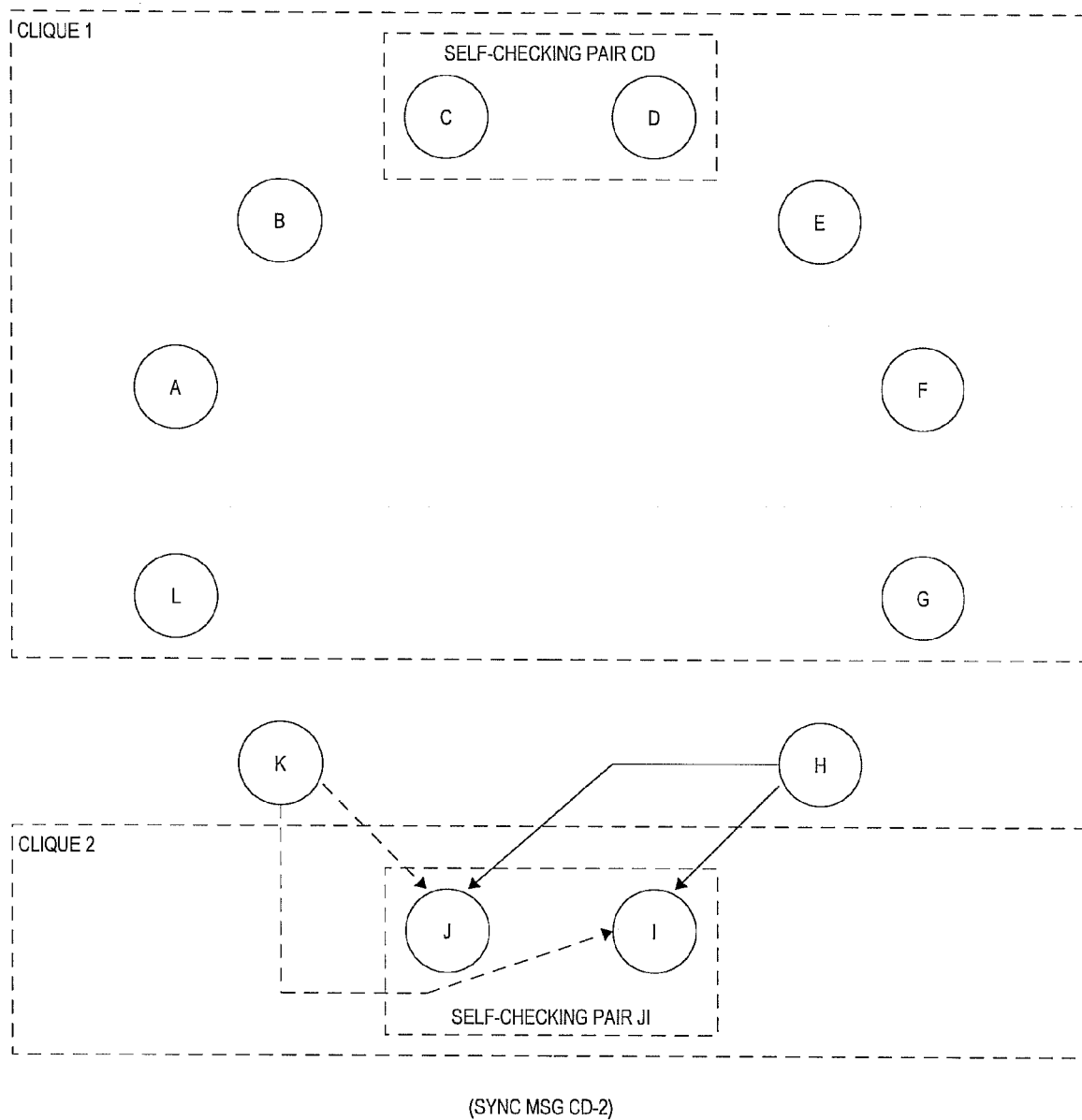
Figure 3F:
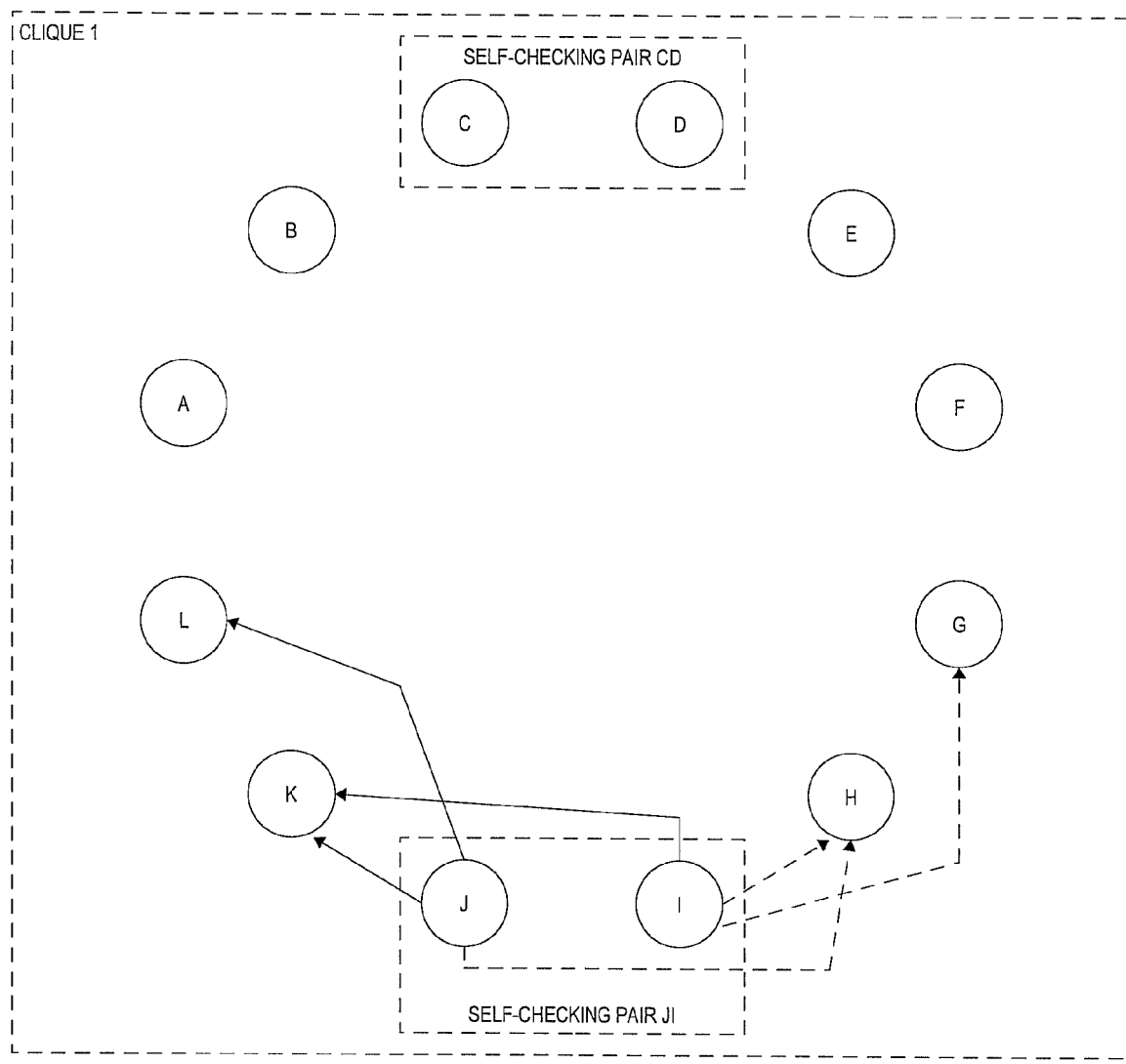

As shown in FIG. 3D, assuming there are no faults, when the self-checking pair CD sends the next synchronization message (synchronization message CD-2) on both channels 0 and 1 around the ring, synchronization message B will eventually be propagated to node H (via nodes F and G) on channel 0 and to node K (via nodes A and L) on channel 1. In this example, node H receives an instance of synchronization message B from nodes F and G with integrity and, node K receives an instance of synchronization message B from nodes A and L with integrity. Both nodes H and K synchronize to the received synchronization message. As shown in FIG. 3E, node H propagates synchronization message B along channel 0 to nodes J and I, and node K propagates synchronization message B along channel 1 to nodes I and J.

Synchronization message B propagates further around clique 2 via channel 0 to nodes I, J, and K. The synchronization message B also propagates further around clique 2 via channel 1 to nodes J, I, and H.

Another example of the operation of method 200 is described in connection FIG. 4. In this example, the integrity reconstitution processing shown in FIG. 2D is used. In the example shown in FIG. 4 (as in the example illustrated in FIGS. 2A-2F), there are two cliques-clique 1 and clique 2, with clique 1 using self-checking pair CD as its synchronization master and clique 2 using self-checking pair JI as its synchronization master. Also, in this example, self-checking pair CD (and clique 1) has a higher priority than self-checking pair JI (and clique 2).

Figure 4:
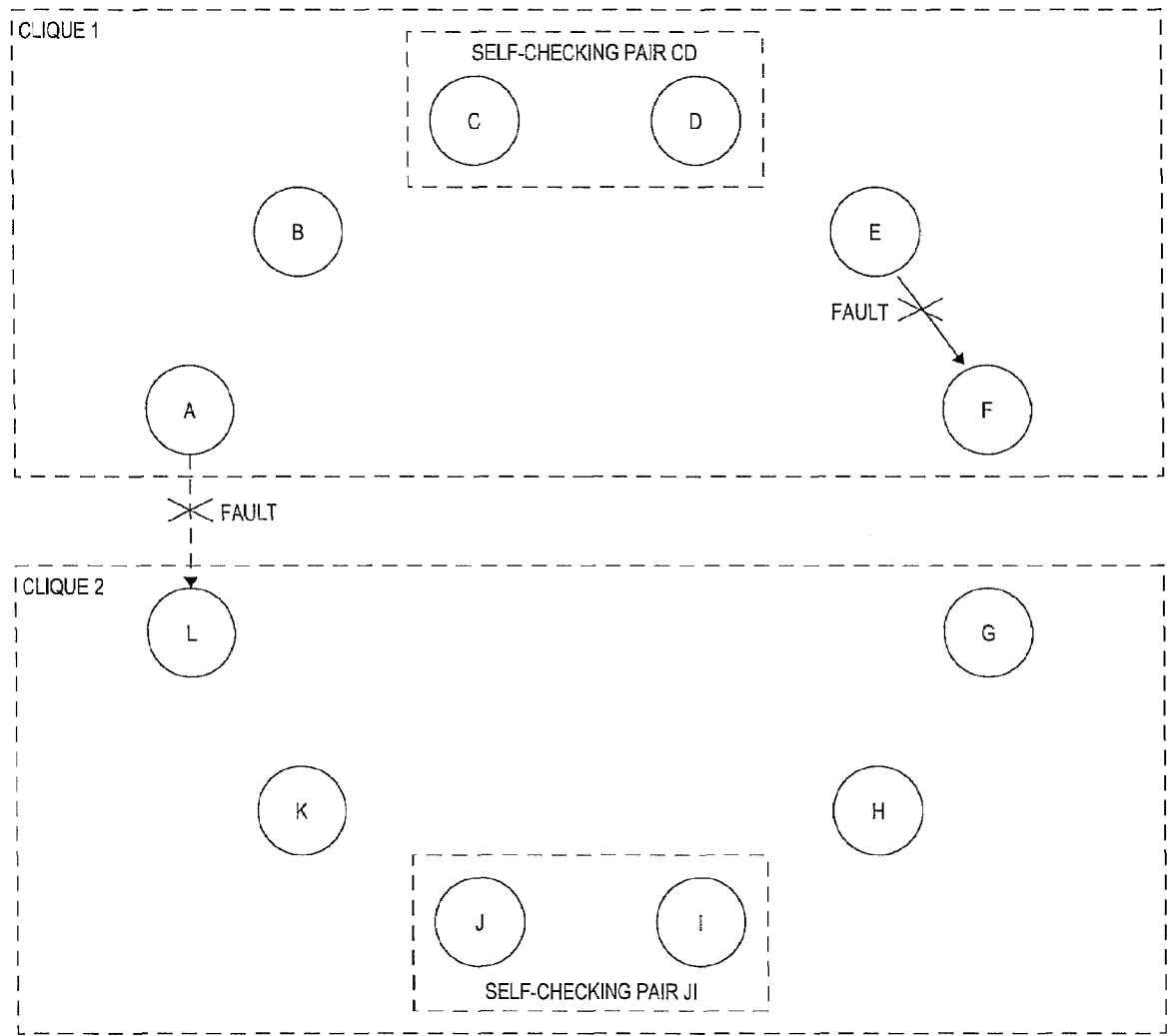
FIG. 4 illustrates another example of the operation of the method shown in FIGS. 2A-2F.

In the example shown in FIG. 4, there are two faults—a first fault that renders the direct link from node E to node F inoperative and a second fault that renders the direct link from node A to node L inoperative. As a result, when synchronization message A is sent from self-checking pair CD on channels 0 and 1, node G receives two instances of synchronization message A from channel 0 but does not receive those instances with integrity (due to the first fault). Also, node L receives only one instance of synchronization message A (due to the second fault). As a result, neither node G nor node L immediately defects to clique 1. Instead, nodes G and L buffer the messages they received and wait until the next break-through slot in the TDMA schedule for clique 2. When the next break-through slot occurs, node G transmits the instance of synchronization message A it buffered along channel 0 and node L transmits the instance of synchronization message it buffered along channel 1. If multiple When an instance of the message transmitted by node L is received at node G, node G performs the bit-for-bit comparison of the received instance with the instance buffered by node G as described above in connection with FIG. 2D. If the comparison results in a match and the sum of the hop counts is equal to N−1, node G defects to clique 1 and propagates the join message along channel 0 as described above in connection with FIG. 2B. Likewise, when an instance of the message transmitted by node G is received at node L, node L performs the bit-for-bit comparison of the received instance with the instance buffered by node L as described above in connection with FIG. 2D. If the comparison results in a match and the sum of the hop counts is equal to N−1, node L defects to clique 1 and propagates the join message along channel 1 as described above in connection with FIG. 2B.

Figure 5:
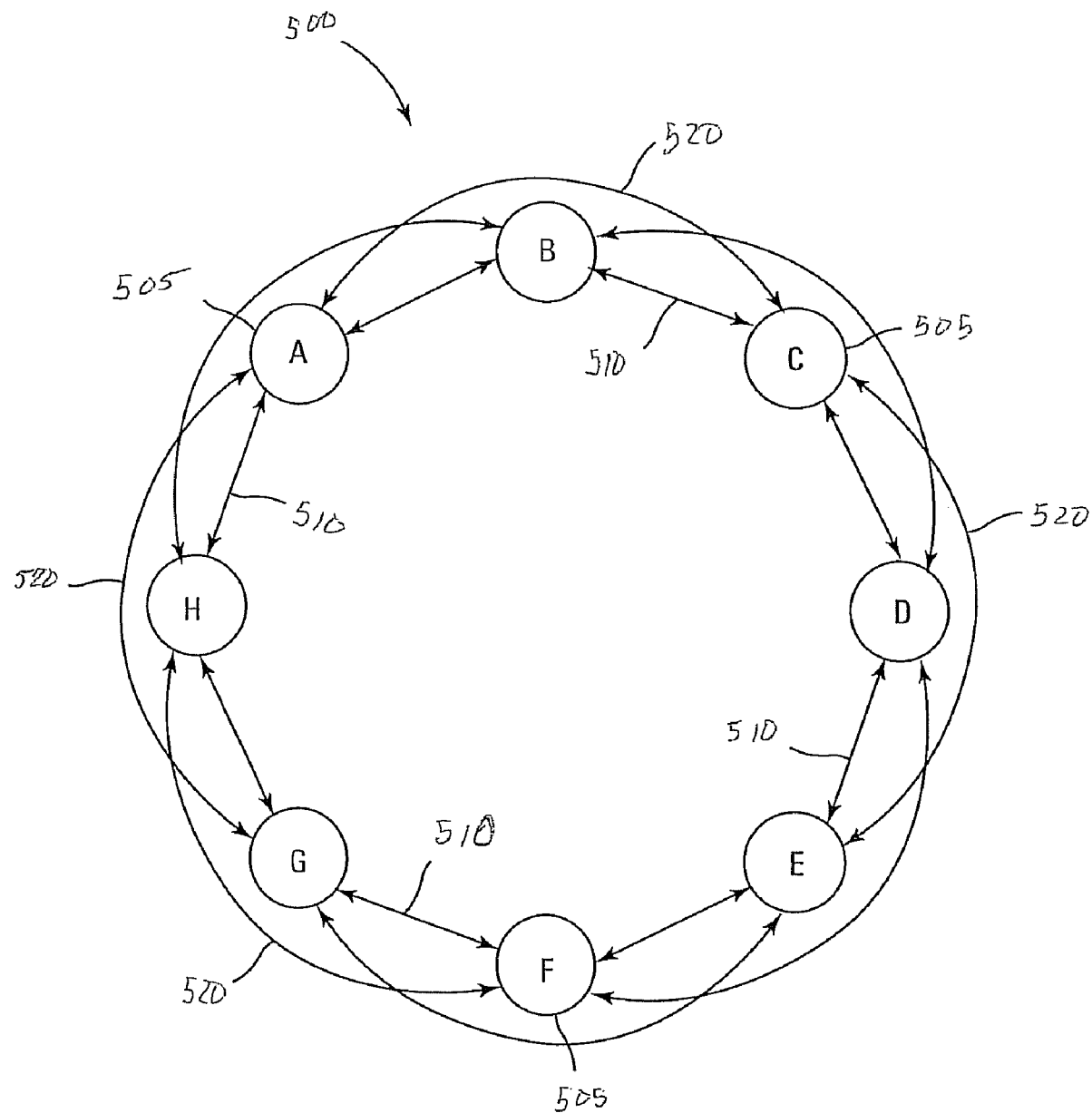
FIG. 5 is a schematic depiction of a bi-directional half-duplex braided ring network.

FIG. 5 is a schematic depiction of a bi-directional half-duplex braided ring network 500. In braided ring network 500, a node 505 (e.g., nodes A-H) is directly connected to its nearest neighbor by a bi-directional direct link 510 and its neighbor's nearest neighbor by a bi-directional skip link 520. Each of direct links 510 and skip links 520 can propagate data in opposing directions along either channel 0 (e.g., counter-clockwise) or channel 1 (e.g., clockwise). Although eight nodes (A-H) are shown in FIG. 5, it should be understood that more or less nodes can be used in network 500.

In order to prevent a collision of data on the ring network, an agreement between two nodes on the same link needs to exist. Such an agreement regulates which node sends at which point in time, i.e., effectively the two nodes fix the direction of data flow for each relevant period of time. Further details related to half-duplex braided ring networks are described in the co-pending '305 application.

The techniques described above in connection with FIGS. 2A-3B can also be used in half-duplex networks of the type described above in connection with FIG. 5. In general, in a half-duplex braided ring network, the relaying of a synchronization message during startup or clique aggregation must take into account the half-duplex nature of the links used in the half-duplex network 500. During startup when two nodes that are coupled to one another over a particular bi-directional half-duplex link have not agreed on a particular TDMA schedule, the two nodes may attempt to transmit or relay data on that link at the same time. This results in a collision, which may delay or even prevent certain startup-related processing from being performed.

Also, more generally, when clique aggregation processing is performed, if a node attempts to use a particular half-duplex link to relay a synchronization message into a clique that the relaying node is not a member of, the node on the other end of that half-duplex link might attempt to use that link at the same time. This would also result in a collision, and the attempt to relay the synchronization message into the other clique would be unsuccessful. As result, clique aggregation processing that is triggered by the asynchronous receipt of a synchronization message from another clique would not be performed.

Figure 6:
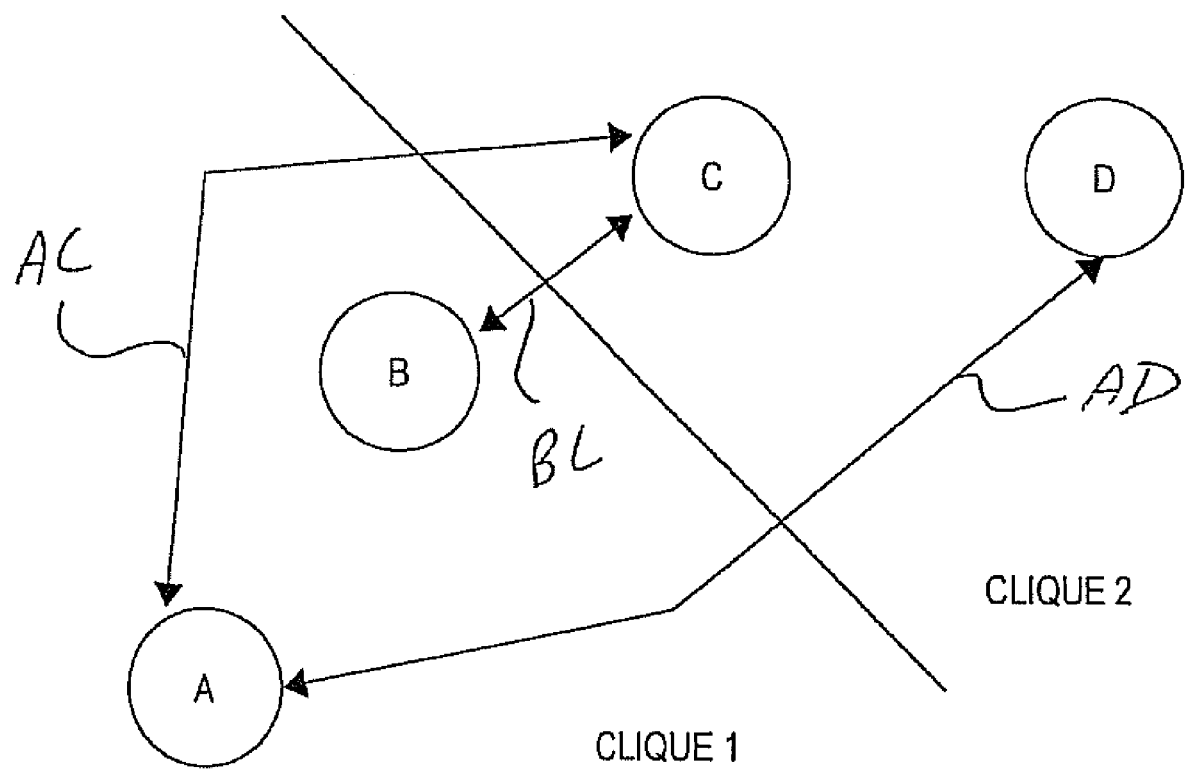
FIG. 6 illustrates one example of a collision on a half-duplex network.

One such example is illustrated in FIG. 6. As shown in FIG. 6, when nodes A and B (which are members of clique 1) attempt to relay a synchronization message into a different clique (clique 2 in FIG. 6) on direct link BC (which couples node B and node C to one another) and skip link AC (which couples node A and node C to one another) and skip link BD (which couples node B and node D to one another), nodes C and D (which are members of clique 2) might be transmitting on those links at that time. Thus, the "normal" relay action of a half-duplex braided ring (as described in the '305 application) may not result in such a synchronization message being relayed into the other clique.

Figure 7:
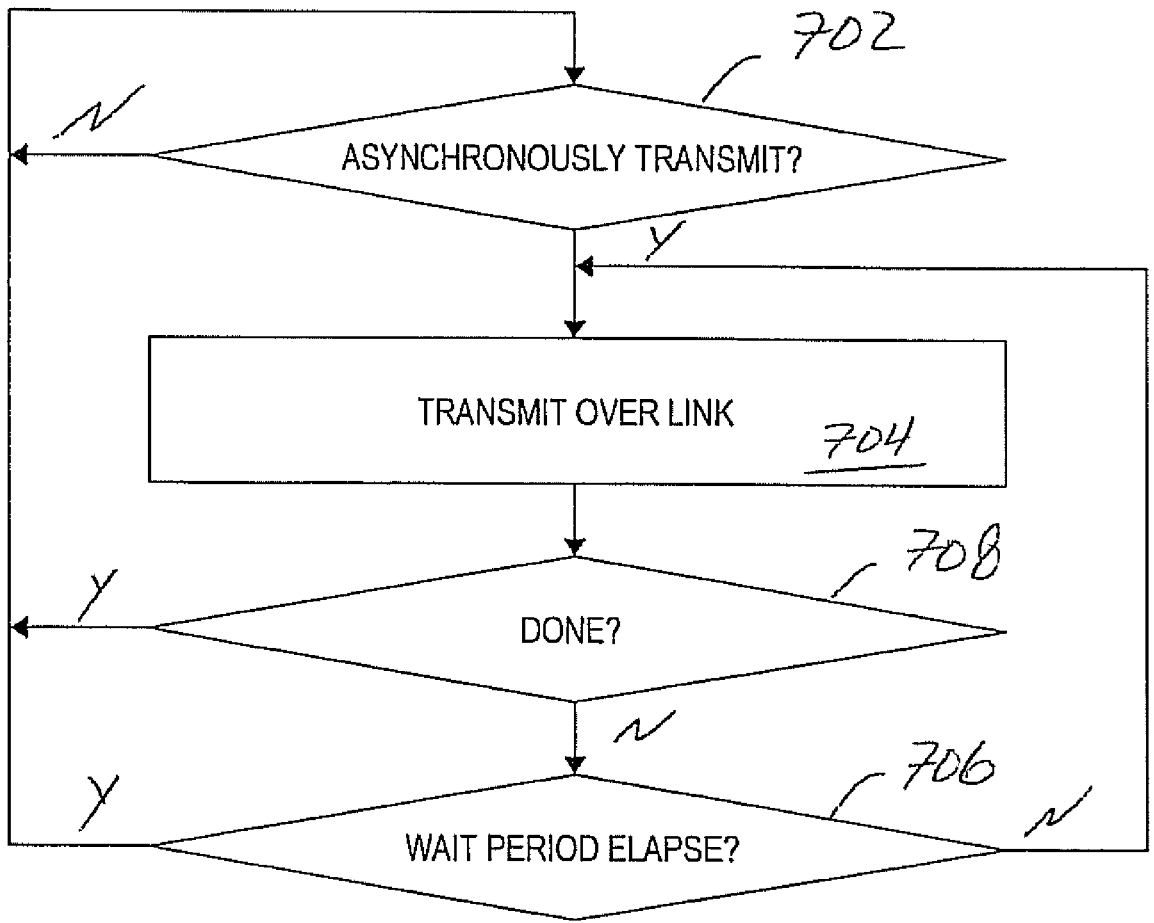
FIG. 7 is a flow diagram of one embodiment of a method transmitting or relaying a message in a half-duplex network.

FIG. 7 is a flow diagram of one embodiment of a method transmitting or relaying a message in a half-duplex network. The embodiment of method 700 is described here as being implemented in a half-duplex braid-ring network of the type shown in FIG. 2 that employs of self-checking pairs that transmit synchronization messages of the type described in the 'H0009526 application (though it is to be understood that other embodiments are implemented in other ways. Method 700 is suitable for use when a first node 102 is attempting to asynchronously transmit or relay a message over a half-duplex link to a second node. In the context of FIG. 7, the node 102 that is performing the processing of method 700 is referred to here as the "current" node 102. In one embodiment, at least a portion of the functionality described here as being performed by the current node 102 is implemented in a controller included in the node 102. Other embodiments of method 700 are implemented in other ways.

For a given half-duplex link that couples a first node and a second node, a first timeout period is associated a priori with the first node for use by the first node in asynchronous transmission over the link and a second timeout period is associated a priori with the second node for use by the second node in asynchronous transmission over the link, where the first timeout period is different from the second timeout period. The size of the difference between the first and second timeout periods is selected to be sufficiently large so that, in the event that both the first node and the second node are attempting to asynchronously transmit over the link at the same time, both nodes will be able to make at least one collision-free transmission or relay before a predetermined number of retries has been attempted.

When the current node 102 wishes to transmit data asynchronously over a half-duplex link (block 702), the current node 102 transmits the data over the half-duplex link (block 704) and then waits for the "timeout" period associated a priori with the current node 102 to elapse. After the predetermined timeout period has elapsed (checked in block 706), the current node 102 transmits the same data again over the half-duplex link (looping back to block 704) and then waits for the predetermined timeout period to elapse again (block 706). The processing of blocks 704-706 is repeated for a predetermined number of times (checked in block 708).

Figure 8A:
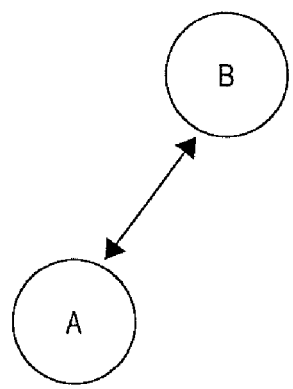
FIGS. 8A-8B is a block diagram illustrating one example of the operation of method.
Figure 8B:
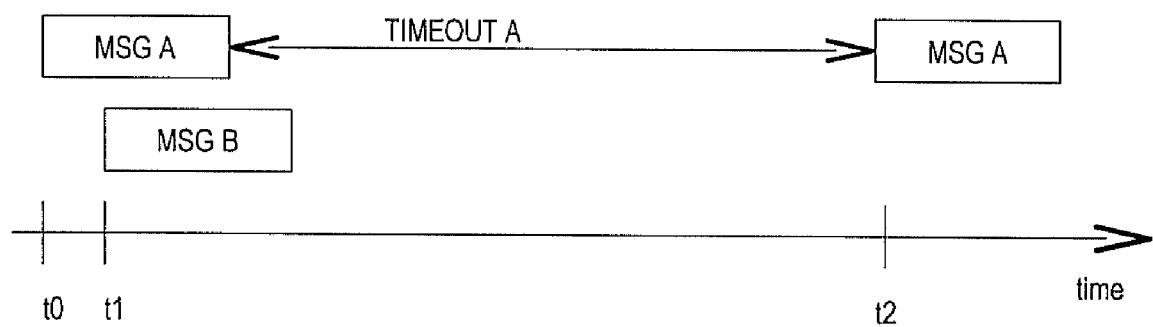

FIGS. 8A-8B is a block diagram illustrating one example of the operation of method 700. In FIG. 8A, nodes A and B are initially members of a first clique 1. Then, node A receives a join message from a temporary self-checking pair that has formed in response to receiving a high-priority synchronization message from a self-checking pair that is a member of second clique (not shown). Node A will then form a temporary self-checking pair with one of its neighbor nodes (not shown) and is attempting to transmit join message A to node B on the direct link AB that couples the nodes together. At the same general time, node B is also attempting to propagate a message B it has received from another node in the first clique to node A on the direct link AB that couples the nodes together. Because node A will have defected from the first clique, node A will transmit the join message A asynchronously using the method 700.

In this example, at time t0, node A initially transmits the join message A on link AB; however, before node A is able to finish transmitting join message A on link AB, at time t1, node B attempts to relay message B on link AB. This results in a collision, and neither message is successfully relayed. Node A then refrains for transmitting for its timeout period. When the first timeout period A for node A elapses at time t2, node A again attempts to transmit the join message A on link AB. Because node B is not using the link AB during the entire time it takes for node A to transmit join message A, node A is able to successfully transmit join message A to node B.

The embodiments of method 200 shown in FIGS. 2A and 2B can be modified for use in half-duplex braided ring networks. In such an embodiment, each frontier node, when it relays a synchronization message into different clique, asynchronously relays the synchronization message using method 700. Moreover, in such a modified method 200, join messages are also asynchronously transmitted and relayed using method 700.

Also, the integrity reconstitution processing described above in connection with FIG. 2B is modified for use in a half-duplex network in order to use two breakthrough slots—one for each channel. In such a modified embodiment, if, when the current node 102 listens asynchronously for data from a silent neighbor and from a silent neighbor's neighbor, the current node 102 receives a synchronization message on only one link or receives a synchronization message on both links but does not receive the message with integrity, the current node 102 buffers the received synchronization message and transmits it during the next break-through slot assigned to the channel from which the message was received. Also, the current node 102 performs a bit-for-bit comparison of the buffered message and any message received on the other channel during the next break-through slot assigned to the other channel. Otherwise, the processing described above in connection with FIG. 2B is performed.

Figure 9:
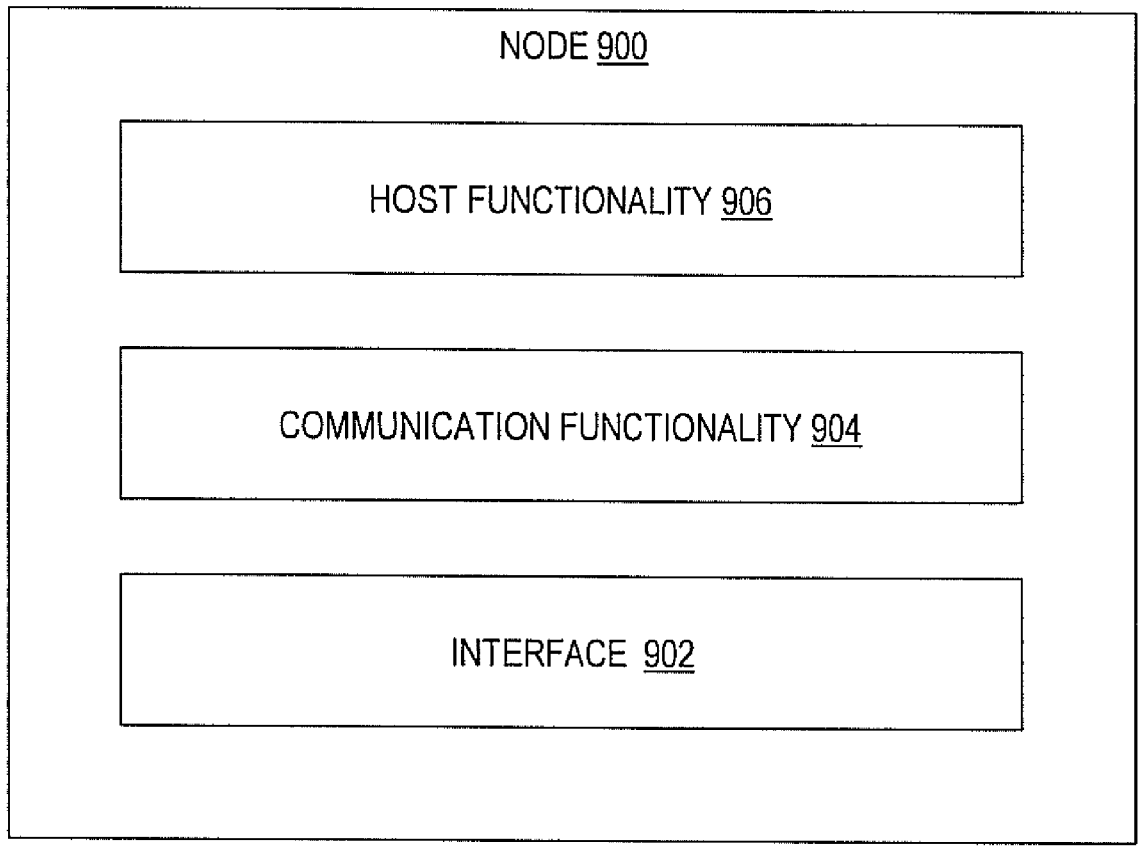
FIG. 9 is a high-level block diagram of one embodiment of an exemplary node suitable for implementing each node of the networks shown in FIGS. 1 and 5 and for implementing the various techniques described below.

FIG. 9 is a high-level block diagram of one embodiment of an exemplary node 900 suitable for implementing each node 102 of the networks shown in FIGS. 1 and 5 and for implementing the various techniques described below. Each node 900 includes one or more interfaces 902 for communicatively coupling the node 900 to the appropriate direct links and skip links illustrated in FIG. 1. Also, the node 900 includes communication protocol functionality 904 and host functionality 906. The communication protocol functionality 904 implements the various communication-related features described here and the related applications. The host functionality 906 implements one or more applications that serve as a source or sink of data that is communicated over the network 100. An example of such a node 102 is described in the '249 application.

The communication functionality 904 and the host functionality can be implemented in hardware, software, or combinations thereof. Moreover, although the interface 902, the communication functionality 904, and the host functionality 906 are shown in FIG. 9 separately, it is to be understood that two or more of the foregoing can be implemented together (for example, by implementing two or more of the foregoing in the same item of software or hardware). It is to be understood that the techniques described here can be implemented in other ways.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A system comprising:
    a plurality of nodes that are communicatively coupled to one another, wherein each of the plurality of nodes, in the absence of any faults, is communicatively coupled to at least a first neighbor node and a first neighbor's neighbor node and a second neighbor node and a second neighbor's neighbor node;
    wherein when at least a first clique and a second clique exist within the plurality of nodes and a first node included in the first clique successfully receives a synchronization message associated with the second clique from the first neighbor node of the first node and the first neighbor's neighbor node of the first node, the first node:

defects to the second clique;

synchronizes to the synchronization message; and communicates a join message to at least the second neighbor node of the first node and the second neighbor's neighbor node of the first node, the join message indicating that the second neighbor node and the second neighbor's neighbor node should defect to the second clique and listen for a subsequent synchronization message from the second clique to which the second neighbor node and the second neighbor's neighbor node should synchronize.

2. The system of claim 1, wherein the first node forms a temporary self-checking pair with another node in order to transmit the join message.

3. The system of claim 2, wherein when the second neighbor node of the first node successfully receives the join message from the first node and the another node, the second neighbor node of the first node:

defects to the second clique;

transmits another join message corresponding to the join message received by the second neighbor node of the first node to at least:
  a second neighbor node of the second neighbor node of the first node; and
  a second neighbor's neighbor node of the second neighbor node of the first node; and waits for a predetermined amount of time for the subsequent synchronization message from the second clique.

4. The system of claim 3, wherein the second neighbor node of the first node forms a temporary self-checking pair with the first node in order to the transmit the another join message.

5. The system of claim 3, wherein if the subsequent synchronization message from the second clique is successfully received by the second neighbor node of the first node both from its first neighbor node and from its first neighbor's neighbor node before the predetermined amount of time has elapsed, the second neighbor node of the first node propagates the second synchronization message to its second neighbor node and second neighbor's neighbor node and synchronizes to the subsequent synchronization message.

6. The system of claim 1, wherein the plurality of nodes are communicatively coupled to another using at least a first channel and a second channel, wherein each node is operable to receive data on the first channel from its first neighbor node and first neighbor's neighbor node and to transmit or propagate data on the first channel to its second neighbor node and second neighbor's neighbor node and is operable to received data on the second channel from its second neighbor node and second neighbor's neighbor node and to transmit or propagate data on the second channel to its first neighbor node and the first neighbor's neighbor node.

7. The system of claim 6, wherein if a node included in the first clique unsuccessfully receives on the first channel a first message that is either a synchronization message from the second clique or a join message, that node treats the first message as successfully received if that node receives a matching second message on the second channel and the first message and the second message were not transmitted by the same node.

8. The system of claim 6, wherein if a node included in the first clique receives on the first channel from only one of its first neighbor node or its first neighbor's neighbor node a first message that is either a synchronization message from the second clique or a join message, that node treats the first message as successfully received from both its first neighbor node and its first neighbor's neighbor node if that node receives a matching second message on the second channel and the first message and the second message were not transmitted by the same node.

9. The system of claim 7, wherein the node determines if the first message and the second message were transmitted by the same node using at least one of a hop count field and an identifier stamp.

10. The system of claim 1, wherein a message is successfully received if an integrity field included in the message includes information indicating that the message has passed one or more integrity checks.

11. A first node comprising:

an interface to communicatively couple the first node to a first channel that communicatively couples a plurality of nodes to one another, the plurality of nodes including the first node;

wherein when the first node is a member of a first clique and successfully receives a first synchronization message associated with a second clique on the first channel from both a neighbor node of the first node and a neighbor's neighbor node of the first node, the first node, if a priority associated with the second clique is higher than a priority associated with the first clique:

defects to the second clique;

synchronizes to the first synchronization message; and forms a temporary self-checking pair with the neighbor node of the first node, wherein the temporary self-checking pair transmits a join message on the first channel;

wherein when the first node is a member of the first clique and successfully receives a join message on the first channel from both the neighbor node of the first node and the neighbor's neighbor node of the first node, the first node:

defects to the second clique;

forms the temporary self-checking pair with the neighbor node of the first node, wherein the temporary self-checking pair transmits a join message on the first channel; and waits for a predetermined amount of time for a second synchronization message associated with the received join message to be successfully received by the first node on the first channel from both the neighbor node of the first node and the neighbor's neighbor node of the first node;

wherein if the second synchronization message is successfully received by the first node on the first channel from both the neighbor node of the first node and the neighbor's neighbor node of the first node before the predetermined amount of time has elapsed, the first node propagates the second synchronization message on the first channel to other nodes and synchronizes to the second synchronization message.

12. The first node of claim 11, wherein the interface communicatively couples the first node to a second channel that communicatively couples the plurality of nodes to one another over.

13. The first node of claim 12, wherein if the first node does not receive the second synchronization message on the first channel from both the neighbor node of the first node and the neighbor's neighbor node but receives the second synchronization message on both the first channel and the second channel, the first node:

determines if the second synchronization message received from the first channel matches the second synchronization message received from the second channel on a bit-for-bit basis;

determine if the second synchronization message was sourced from a single node; and if the second synchronization message received from the first channel matches the second synchronization message received from the second channel on the bit-for-bit basis and the second synchronization message was not sourced from a single node, the first node propagates the second synchronization message on the first and second channels to other nodes and synchronizes to the second synchronization message.

14. The first node of claim 13, wherein each synchronization message comprises a hop count field, wherein each node, when relaying a synchronization message, updates the synchronization message by:

incrementing the hop count field of the received synchronization message by one if the received synchronization message was received from both a neighbor node and a neighbor's neighbor node;

reset the hop count field of the received synchronization message to one if the received synchronization message was only received from a neighbor node; and reset the hop count field of the received synchronization message to two if the received synchronization message was only received from a neighbor's neighbor node;

wherein the first node determines if the second synchronization message was sourced from a single node by adding the hop count field of the second synchronization message received from the first channel to the second synchronization message received from the second channel in order to generate a sum, wherein the second synchronization message is considered to have been sourced from a single node if the sum is not equal to one less than the number of the plurality of nodes.

15. The first node of claim 11, wherein the first clique has an associated time-division multiple access schedule comprising a plurality of time slots, wherein at least one of the plurality of time slots comprises a breakthrough time slot;

wherein if the first node receives the first synchronization message on the first channel from only one of a neighbor node of the first node and a neighbor's neighbor node of the first node, the first node, if a priority associated with the second clique is higher than a priority associated with the first clique:

transmits on the first channel, during the breakthrough slot, a first breakthrough message comprising information indicative the source of the synchronization message received on the first channel;

if the first node receives on the second channel a second breakthrough message, the first node:

determines if the first breakthrough message matches the second breakthrough message on a bit-for-bit basis;

if the first breakthrough message matches the second breakthrough message on a bit-for-bit basis, the first node:

defects to the second clique; and forms a temporary self-checking pair with the neighbor node of the first node, wherein the temporary self-checking pair transmits a join message on the first channel; and waits for a predetermined amount of time for the second synchronization message associated with the first synchronization message to be successfully received by the first node on the first channel from both the neighbor node of the first node and the neighbor's neighbor node of the first node;

wherein if the second synchronization message is successfully received by the first node on the first channel from both the neighbor node of the first node and the neighbor's neighbor node of the first node before the predetermined amount of time has elapsed, the first node synchronizes to the second synchronization message and propagates the second synchronization message to other nodes on the first channel.

16. The first node of claim 12, wherein the nodes are communicatively coupled to one another over the first channel and the second channel using half-duplex communication links.

17. The first node of claim 16, wherein when the first node communicates asynchronously over a half-duplex communication link, the first node does the following a predetermined number of times:

transmits a message over the half duplex communication link; and waits for a predetermined amount of time before transmitting again.

18. The first node of claim 11, wherein the nodes are communicatively coupled to one another over the first channel using full-duplex communication links.

19. A method of performed by a first node included in a plurality of nodes, wherein the plurality of nodes are communicatively coupled to one another over at least a first channel, the method comprising:

when the first node successfully receives, on the first channel from both a neighbor node of the first node and a neighbor's neighbor node of the first node, a first synchronization message associated with a clique that the first node is not currently a member of, the first node:

determining if a priority associated with the clique associated with first synchronization member is higher than a priority associated with the clique the first node is currently a member of;

if the priority associated with the clique associated with first synchronization member is higher than the priority associated with the clique the first node is currently a member of:

defecting to the clique associated with the first synchronization message;

synchronizing to the first synchronization message; and forming a temporary self-checking pair with the neighbor node of the first node, wherein the temporary self-checking pair transmits a join message on the first channel.

20. The method of claim 19, further comprising:

wherein when the first node successfully receives a join message on the first channel from both a neighbor node of the first node and a neighbor's neighbor node of the first node:

defecting to a clique associated with the join message;

forming the temporary self-checking pair with the neighbor node of the first node, wherein the temporary self-checking pair transmits the join message on the first channel; and waiting for a predetermined amount of time for a second synchronization message associated with the received join message to be successfully received by the first node on the first channel from both the neighbor node of the first node and the neighbor's neighbor node of the first node;

wherein if the second synchronization message is successfully received by the first node on the first channel from both the neighbor node of the first node and the neighbor's neighbor node of the first node before the predetermined amount of time has elapsed, propagating the second synchronization message on the first channel to other nodes and synchronizing to the second synchronization message.

* * * * *

UNITED STATES PATENT AND TRADEMARK OFFICE
CERTIFICATE OF CORRECTION

PATENT NO. : 7,656,881 B2
APPLICATION NO. : 11/610450
DATED : February 2, 2010
INVENTOR(S) : Hall et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 444 days.

Signed and Sealed this

Thirtieth Day of November, 2010

David J. Kappos
*Director of the United States Patent and Trademark Office*